US012119195B2

(12) United States Patent
Park

(10) Patent No.: US 12,119,195 B2
(45) Date of Patent: Oct. 15, 2024

(54) ARC EXTINGUISHING ASSEMBLY AND CIRCUIT BREAKER COMPRISING SAME

(71) Applicant: LS ELECTRIC CO., LTD., Anyang-si (KR)

(72) Inventor: Yong Ik Park, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 143 days.

(21) Appl. No.: 17/909,626

(22) PCT Filed: Feb. 26, 2021

(86) PCT No.: PCT/KR2021/002495
§ 371 (c)(1),
(2) Date: Sep. 6, 2022

(87) PCT Pub. No.: WO2021/177676
PCT Pub. Date: Sep. 10, 2021

(65) Prior Publication Data

US 2023/0120215 A1 Apr. 20, 2023

(30) Foreign Application Priority Data

Mar. 3, 2020 (KR) ........................ 10-2020-0026653

(51) Int. Cl.
*H01H 9/34* (2006.01)
*H01H 33/08* (2006.01)
*H01H 71/02* (2006.01)

(52) U.S. Cl.
CPC ........ *H01H 71/0214* (2013.01); *H01H 9/342* (2013.01); *H01H 33/08* (2013.01)

(58) Field of Classification Search
CPC ........... H01H 71/0214; H01H 71/0235; H01H 71/18; H01H 9/342; H01H 9/345; H01H 33/08; H01H 73/18
(Continued)

(56) References Cited

U.S. PATENT DOCUMENTS 6,248,971 B1 * 6/2001 Morel ................ H01H 71/1045 218/152
7,034,242 B1 * 4/2006 Shea ...................... H01H 73/18 218/156
(Continued)

FOREIGN PATENT DOCUMENTS

CN 202423182 U 9/2012
CN 107134395 A 9/2017
(Continued)

OTHER PUBLICATIONS

Translation of KR20180124825 (Document published Nov. 21, 2018) (Year: 2018).*
(Continued)

*Primary Examiner* — William A Bolton
(74) *Attorney, Agent, or Firm* — K&L Gates LLP

(57) ABSTRACT

The present disclosure relates to an arc extinguishing assembly including a sealing member and a circuit breaker including same. The sealing member is pressed and elastically deformed between coupling surfaces of the arc extinguishing assembly and the circuit breaker, and accordingly, a gap between the coupling surfaces of the arc extinguishing assembly and the circuit breaker is sealed. Accordingly, when an arc is generated, a temporary pressure increase in the circuit breaker increases and the arc can be smoothly extended.

18 Claims, 16 Drawing Sheets

(a)

(b)

(58) Field of Classification Search
USPC .............................. 218/1, 15, 23, 22, 34, 46
See application file for complete search history.

(56) References Cited

U.S. PATENT DOCUMENTS

| | | | | |
|---|---|---|---|---|
| 9,153,399 | B2 * | 10/2015 | Afshari | H01H 33/08 |
| 9,715,979 | B2 * | 7/2017 | Bresciani | H01H 33/42 |
| 9,818,560 | B2 * | 11/2017 | Baek | H01H 71/10 |
| 10,020,144 | B2 * | 7/2018 | Rival | H01H 73/18 |
| 10,522,310 | B2 * | 12/2019 | Rival | B01D 46/12 |
| 2003/0048586 | A1 | 3/2003 | Faber et al. | |
| 2010/0170876 | A1 * | 7/2010 | Bach | H01H 9/342<br>29/622 |
| 2011/0259852 | A1 | 10/2011 | Rival et al. | |

FOREIGN PATENT DOCUMENTS

| | | | |
|---|---|---|---|
| KR | 1020130133555 | A | 12/2013 |
| KR | 101624440 | B1 | 5/2016 |
| KR | 1020160125005 | A | 10/2016 |
| KR | 1020180124825 | A | 11/2018 |

OTHER PUBLICATIONS

International Search Report for related International Application No. PCT/KR2021/002495; report dated Sep. 28, 2021; (5 pages).
Written Opinion for related International Application No. PCT/KR2021/002495; report dated Sep. 28, 2021; (11 pages).
Supplementary Search Report for related European Application No. 21765343.5; action dated Mar. 13, 2024; (12 pages).

* cited by examiner (a)

(b)

(a)

(b)

(a)

(b)

(a)

(b)

ARC EXTINGUISHING ASSEMBLY AND CIRCUIT BREAKER COMPRISING SAME

CROSS-REFERENCE TO RELATED APPLICATION

The present application is a National Stage of International Application No. PCT/KR2020/002495 filed on Feb. 26, 2021, which claims priority to and the benefit of Korean Utility Model Application No. 10-2020-0026653, filed on Mar. 3, 2020, the disclosure of which is incorporated herein by reference in its entirety.

FIELD

The present disclosure relates to an arc extinguishing assembly and a circuit breaker including the same, and more specifically to an arc extinguishing assembly including a sealing member and a circuit breaker including the same.

BACKGROUND

A circuit breaker is a device that blocks the flow of current when abnormal current such as electrical leakage, short circuit or excessive current occurs in the circuit. Through this, it is possible to prevent an accident that may occur in a circuit or an electronic device connected to the circuit. The circuit breaker is energably installed at a specific position in the circuit such that the current of the circuit passes through the circuit breaker.

A conventional circuit breaker has, as is well known, a stationary contact point and a movable contact point formed so as to be proximate or spaced apart from the stationary contact point.

When a normal current flows, the movable contact point is in contact with the stationary contact point. When the movable contact point and the stationary contact point are in contact and energized with each other, the circuit is connected so as to be energized.

When an abnormal current is generated, the movable contact point is spaced apart from the stationary contact point. When the movable contact point and the stationary contact point are spaced apart, the flow of current in the circuit is cut off.

Immediately after the moving contact point is separated from the stationary contact point, a part of the stationary contact point or the movable contact point is melted, and vaporized metal vapor is generated. The current flowing through the movable contact point and the stationary contact point is converted into an arc flowing through the vapor of the metal, and the arc is extended in an arcuate shape as the movable contact point moves away from the stationary contact point.

The arc is a flow of plasma composed of electrons and ions at high temperature and high pressure.

The generated arc is cooled after undergoing an extinguishing process in the arc extinguishing assembly, and discharged to the outside of the arc extinguishing assembly.

Hereinafter, the arc extinguishing process in a conventional circuit breaker will be described with reference to FIGS. 1 to 2.

Referring to FIG. 1, an arc extinguishing assembly 20 for extinguishing the generated arc is illustrated.

The arc extinguishing assembly 1000 is disposed above the stationary contact point (not illustrated) to extinguish the generated arc.

The arc extinguishing assembly 1000 includes a plurality of grids 1300 that are spaced apart from each other and stacked in a direction away from the stationary contact point (not illustrated), and the upper side of the plurality of grids 1300 is formed with an exhaust 1100 for discharging the extinguished arc.

On the left and right sides of the grid 1300, downwardly extended parts are formed, respectively, and the ends of each of the extended parts are inserted and accommodated in an arc guide 1500.

Since the ends of the extended parts are surrounded by the arc guide 1500, it can be suppressed that the generated arc is moved to the ends of the extended parts and the arc extinguishing efficiency is reduced.

Referring to FIG. 2, an arc is extinguished by extending from a plurality of grids 1300 and an arc runner 1400.

When the movable contact point (not illustrated) on the lower side of the arc extinguishing assembly 1000 is separated from the stationary contact point (not illustrated), an arc is generated as described above. The generated arc is extended along the movable contact point.

Specifically, metal gas is generated between the movable contact point and the stationary contact point, and the pressure inside the circuit breaker is increased instantaneously, and the arc is extended toward the grid 1300 and the arc runner 1400 by a pressure difference.

The extended arc reaches the plurality of grids 1300 and the runner 1400, and the reached arc extends upward while flowing along the grids 1300 and the runner 1400.

In the process of arc extension, the voltage of the arc rises, and the arc is cooled and discharged to the outside of the circuit breaker.

When the arc extinguishing assembly 1000 is inserted into the circuit breaker, a gap may be generated between the exhaust 1100 and the circuit breaker.

In this case, when an arc is generated, the leakage of fluid inside the circuit breaker may occur through the gap. Then, when an arc is generated, there may be a problem in that a sufficient pressure is not formed to push the arc upward.

As a result, the arc may not be sufficiently extended to reduce the arc extinguishing performance, thereby causing damage to the circuit breaker due to the arc.

SUMMARY

It is an object of the present disclosure to provide an arc extinguishing assembly having a structure capable of solving the above-described problems and a circuit breaker including the same.

First, an object of the present disclosure is to provide an arc extinguishing assembly having a structure capable of increasing a temporary pressure increase value inside the circuit breaker when an arc is generated, and a circuit breaker including the same.

In addition, another object of the present disclosure is to provide an arc extinguishing assembly having a structure capable of suppressing the leakage of fluid between the circuit breaker and the arc extinguishing assembly when an arc is generated, and a circuit breaker including the same.

In addition, still another object of the present disclosure is to provide a circuit breaker having a structure capable of sealing a gap between the circuit breaker and the arc extinguishing assembly when an arc is generated.

In addition, still another object of the present disclosure is to provide an arc extinguishing assembly having a structure capable of improving the arc extinguishing performance when an arc is generated, and a circuit breaker including the same.

In order to achieve the above objects, the present disclosure provides an arc extinguishing assembly, including an exhaust which is inserted into an accommodation space having an opening formed on one side, and covers the opening; and plate-shaped side portions which are respectively coupled to both side surfaces of the exhaust inside the accommodation space and spaced apart from each other by a predetermined distance to face each other.

In addition, the exhaust includes an exhaust body having both sides coupled to the side portion in a first direction, an accommodation portion formed to penetrate through the center, and mounting portions formed to protrude from both sides in a second direction intersecting with the first direction; an exhaust cover which is coupled to one side surface of the exhaust body to cover the accommodation portion; and a sealing member which is coupled to the exhaust body.

In addition, mounting spaces in which the mounting portions are mounted are formed on both sides of the opening in the second direction, respectively.

In addition, the sealing member includes a first sealing portion which is located between the mounting portion and the mounting space and extends by a predetermined length in the first direction; a second sealing portion which is located between the exhaust cover and the exhaust body and extends from both sides of the exhaust body in the first direction by a predetermined length in the second direction; and a third sealing portion which is located between the mounting portion and the mounting space and connects both ends of the first sealing portion and both ends of the second sealing portion.

In addition, the sealing member is formed of an elastic member.

In addition, the arc extinguishing assembly further includes an arc extinguishing assembly fastening member which penetrates the exhaust cover and the mounting portion, and has one end penetrating the exhaust cover and the mounting portion fastened to the mounting space, wherein the sealing member is configured to be elastically deformed by being pressed by a fastening force of the arc extinguishing assembly fastening member.

In addition, the second sealing portion includes a second base portion which extends by a predetermined length in the second direction; and a wing which is formed to protrude from the second base portion in a direction away from the accommodation portion and extends by a predetermined length in the second direction.

In addition, the length of the exhaust cover in the first direction is formed to be longer than the exhaust body.

In addition, cover mounting grooves for mounting both sides of the exhaust cover are formed on both sides of the opening in the first direction, and the wing is located between the cover mounting grooves and the both sides of the exhaust cover.

In addition, the wing is configured to be elastically deformed by being pressed between one side surface of the cover mounting groove and the both sides of the exhaust cover.

In addition, a wing accommodation groove is formed to be recessed by a predetermined depth in a part of the exhaust cover facing the cover mounting groove.

In addition, the thickness of the wing is formed to be larger than the value of the distance between the one side surface of the cover mounting groove and the exhaust cover.

In addition, a first sealing portion insertion groove and a third sealing portion insertion groove are formed to be recessed in a part of the mounting portion facing the mounting space, wherein the first sealing portion is inserted into the first sealing portion insertion groove, and wherein the third sealing portion is inserted into the third sealing portion insertion groove.

In addition, the first sealing portion is elastically deformed by being pressed between one side surface of the mounting space and the first sealing portion insertion groove, and wherein the third sealing portion is elastically deformed by being pressed between the other side surface of the mounting space and the third sealing portion insertion groove.

In addition, the thickness of the first sealing portion is formed to be larger than the value of the distance between one side surface of the mounting space and the first sealing portion insertion groove, and wherein the thickness of the third sealing portion is formed to be larger than the value of the distance between the other side surface of the mounting space and the third sealing portion insertion groove.

In addition, the second sealing portion includes a hook insertion portion which extends from the second base portion in a direction close to the accommodation portion by a predetermined length and then protrudes by a predetermined length toward the exhaust body.

In addition, an insertion groove is formed to be recessed by a predetermined depth on one side surface of the exhaust body facing the hook insertion portion, and wherein the hook insertion portion is accommodated in the insertion groove.

In addition, among parts of the second base portion, a second protrusion is formed on the other side surface opposite to one side surface facing the exhaust cover.

In addition, a first protrusion is formed on the first sealing portion to extend by a predetermined length in a direction in which the mounting portion protrudes, and wherein among parts of the mounting portion, a predetermined space into which the first protrusion is inserted is formed to be recessed on one side surface facing the first protrusion.

Further, in order to achieve the above objects, the present disclosure provides a circuit breaker, including a circuit breaker body formed with an accommodation space with one side open inside; and an arc extinguishing assembly including an exhaust which is inserted into the accommodation space and covers an opening of the accommodation space.

In addition, the exhaust includes an exhaust body through which an accommodation portion is formed to penetrate the center, and mounting portions are formed to protrude from both sides; an exhaust cover which is coupled to one side surface of the exhaust body to cover the accommodation portion; and a sealing member which is coupled to the exhaust body.

In addition, mounting spaces in which the mounting portions are mounted are formed on both sides of an opening of the accommodation space in a first direction in which the mounting portion protrudes, respectively.

Further, in the mounting spaces, a first coupling surface facing the mounting portion is formed; and a third coupling surface facing the mounting portion is formed on both sides of the first coupling surface, respectively.

In addition, second coupling surfaces on which both sides of the exhaust are supported are formed on both sides of an opening of the accommodation space, in a second direction intersecting with the first direction, respectively.

In addition, the sealing member includes a first sealing portion which is located between the mounting portion and the first coupling surface; a second sealing portion which is located between the exhaust cover and the exhaust body, on both sides in the second direction; and a third sealing portion which is located between the mounting portion and the third coupling surface and connects both ends of the first sealing portion and both ends of the second sealing portion.

In addition, the second sealing portion includes a second base portion which is located between the exhaust cover and the exhaust body, on both sides in the second direction; and a wing which is formed to protrude from the second base portion in a direction away from the accommodation portion.

In addition, the wing is located between the second coupling surface and the both sides of the exhaust cover.

In addition, the wing is configured to be elastically deformed by being pressed between the second coupling surface and the both sides of the exhaust cover.

In addition, a wing accommodation groove is formed to be recessed by a predetermined depth, in a part of the exhaust cover facing the second coupling surface.

According to the present disclosure, the following effects are derived.

First, a sealing member is provided in a gap between the arc extinguishing assembly and the circuit breaker. Accordingly, the leakage of fluid inside the circuit breaker through the gap between the arc extinguishing assembly and the circuit breaker is suppressed.

As a result, when an arc is generated, a temporary pressure increase value inside the circuit breaker can be increased.

As a result, the extension length of the arc is increased, whereby the arc voltage can be further increased.

As a result, the arc extinguishing performance can be improved, whereby, when an arc is generated, damage due to the arc in the configuration of the circuit breaker can be suppressed from occurring.

In addition, the sealing member is elastically deformed by being pressed by a fastening force of the arc extinguishing assembly and the circuit breaker. The elastically deformed sealing member presses the mutual coupling surface between the arc extinguishing assembly and the circuit breaker.

If the fastening force between the arc extinguishing assembly and the circuit breaker is increased, the amount of elastic deformation of the sealing member is increased. When the elastic deformation amount of the sealing member is increased, the sealing member presses the mutual coupling surface between the arc extinguishing assembly and the circuit breaker more strongly.

That is, as the fastening force between the arc extinguishing assembly and the breaker is increased, the sealing force between the arc extinguishing assembly and the breaker can be improved.

EXPLANATION OF REFERENCE NUMERALS

Figure 1:
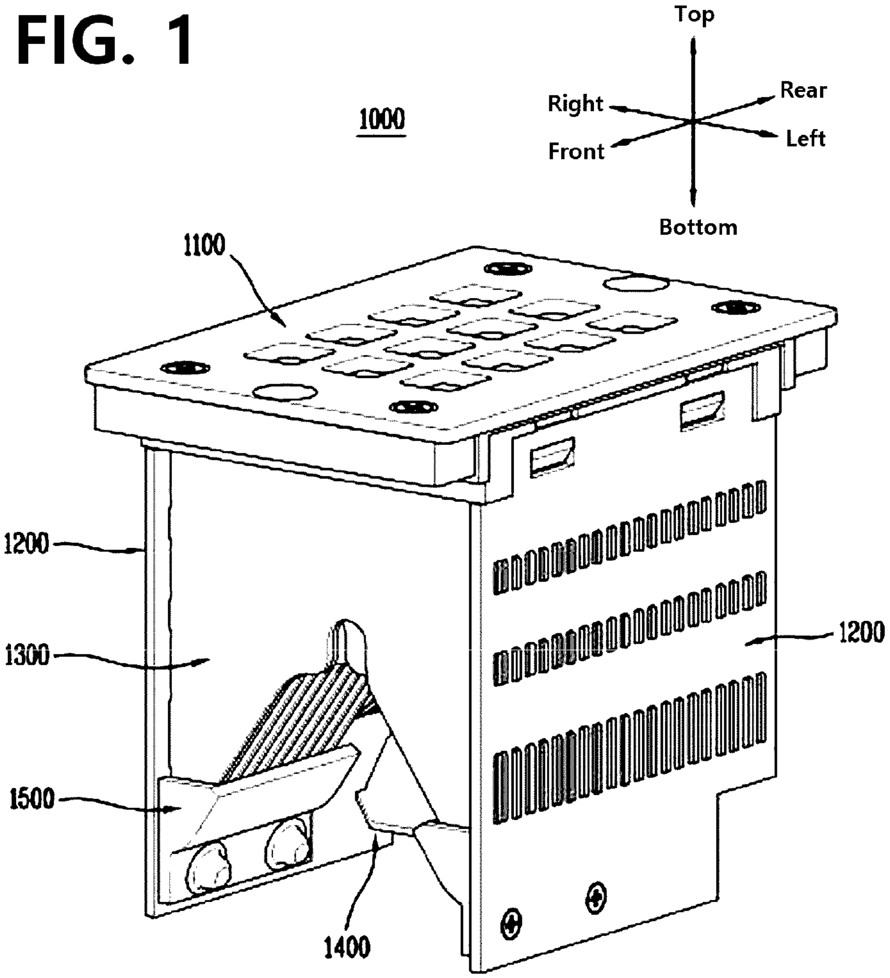
FIG. 1 is a perspective view illustrating a conventional arc extinguishing assembly.
Figure 2:
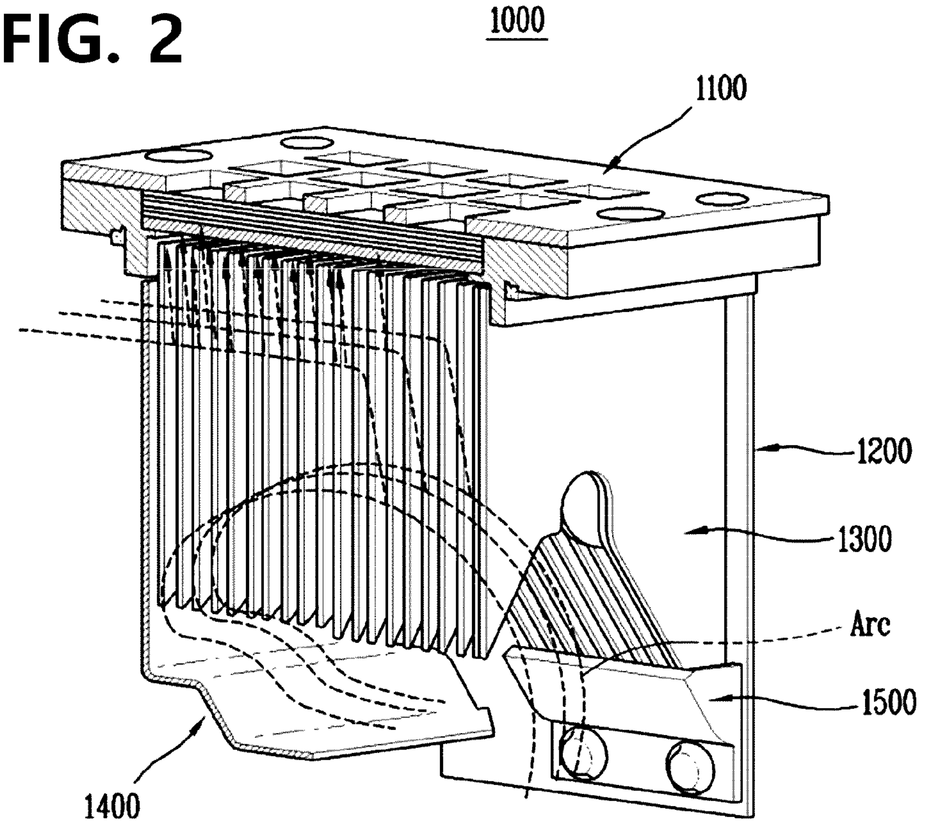
FIG. 2 is a cross-sectional perspective view illustrating a path in which an arc is extended in the arc extinguishing assembly of FIG. 1.

| | |
|---|---|
| 1: Circuit breaker | 2: Circuit breaker body |
| 2a: Accommodation space | 2b1: First coupling surface |
| 2b2: Second coupling surface | 2b3: Third coupling surface |
| 2c: Mounting space coupling groove | 2d: Mounting space |
| 2e: Cover mounting groove | 3: Arc extinguishing assembly |
| 4: Arc extinguishing assembly fastening member | |
| 10: Exhaust | |
| 20: Side portion | 21: Snap fastening hole |
| 22: Grid fastening hole | 23: Arc runner fastening hole |
| 30: Grid | 31: Grid body |
| 32: Grid fastening protrusion | 40: Arc runner |
| 41: Arc runner body | 42: Arc runner fastening protrusion |
| 100: Exhaust cover | 110: Gas outlet |
| 120: First cover coupling hole | 130: Second cover coupling hole |
| 140: Wing accommodation groove | 200: Filter |
| 300: Insulation plate | 310: Exhaust hole |
| 400: Exhaust body | 410: Mounting portion |
| 411: First mounting portion coupling hole | |
| 412: Second mounting portion coupling hole | |

-continued

| | |
|---|---|
| 413: First sealing portion insertion groove | |
| 414: Third sealing portion insertion groove | |
| 420: Frame portion | 420a: Accommodation portion |
| 421: Support | 422: Side coupling portion |
| 423: Side coupling space | 424: Snap protrusion |
| 425: First insertion groove | 426: Second insertion groove |
| 500: Sealing member | 510: First sealing portion |
| 511: First base portion | 512: First protrusion |
| 520: Second protrusion | 521: Hook insertion portion |
| 522: Second base portion | 522a: Second protrusion |
| 523: Wing | 530: Third sealing portion |
| 610: Fastening bolt | 620: Fastening nut |

DETAILED DESCRIPTION

Hereinafter, the arc extinguishing assembly and circuit breaker including the same according to an exemplary embodiment of the present disclosure will be described in detail with reference to the accompanying drawings.

In the following description, the descriptions of some components may be omitted in order to clarify the characteristics of the present disclosure.

1. Definitions of Terms

The term 'circuit breaker' used below means a device that is connected to a circuit to detect a situation in which a leakage current or overcurrent flows or a short circuit occurs in the circuit, and blocks the flow of current in the circuit when such a situation occurs. In an exemplary embodiment, the circuit breaker may be provided as an air circuit breaker.

The term 'normal current' used below means a current in a state where the circuit breaker does not perform a blocking operation. Specifically, it means a current flowing within a preset current range value in the breaker, a current in a state where current leakage does not occur, or a current in a state where a short circuit does not occur.

The term 'abnormal current' used below means a current in a state where the circuit breaker performs a blocking operation. Specifically, it means a current exceeding a preset current range value in the breaker, a current in a state where current leakage occurs, or a current in a state where a short circuit occurs.

The term 'arc' used below means a plasma of electrons and ions generated when a movable contact point and a stationary contact point in a state where current flows through contact with each other are spaced apart.

The terms 'front side', 'rear side', 'left', 'right', 'top' and 'bottom' used below may be understood with reference to the coordinate system illustrated in FIGS. 1, 3 to 8 and 10.

2. Description of the Configuration of the Circuit Breaker 1 According to an Exemplary Embodiment of the Present Disclosure Hereinafter, the configuration of the circuit breaker 1 according to an exemplary embodiment of the present disclosure will be described with reference to FIG. 3. In the illustrated exemplary embodiment, parts of the entire arc extinguishing assembly 3 are omitted.

Figure 3:
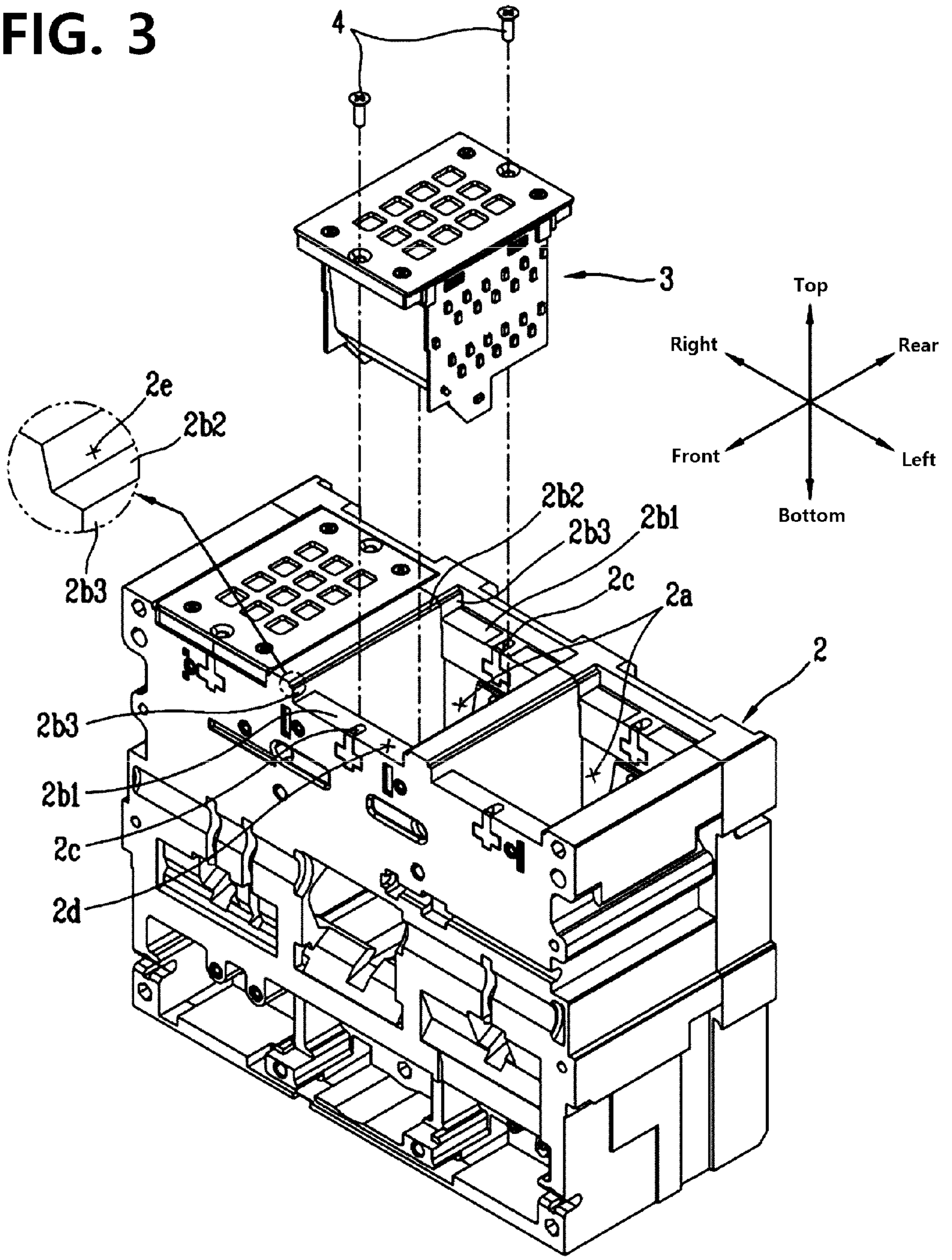
FIG. 3 is an exploded perspective view of the circuit breaker according to an exemplary embodiment of the present disclosure.
Figure 4:
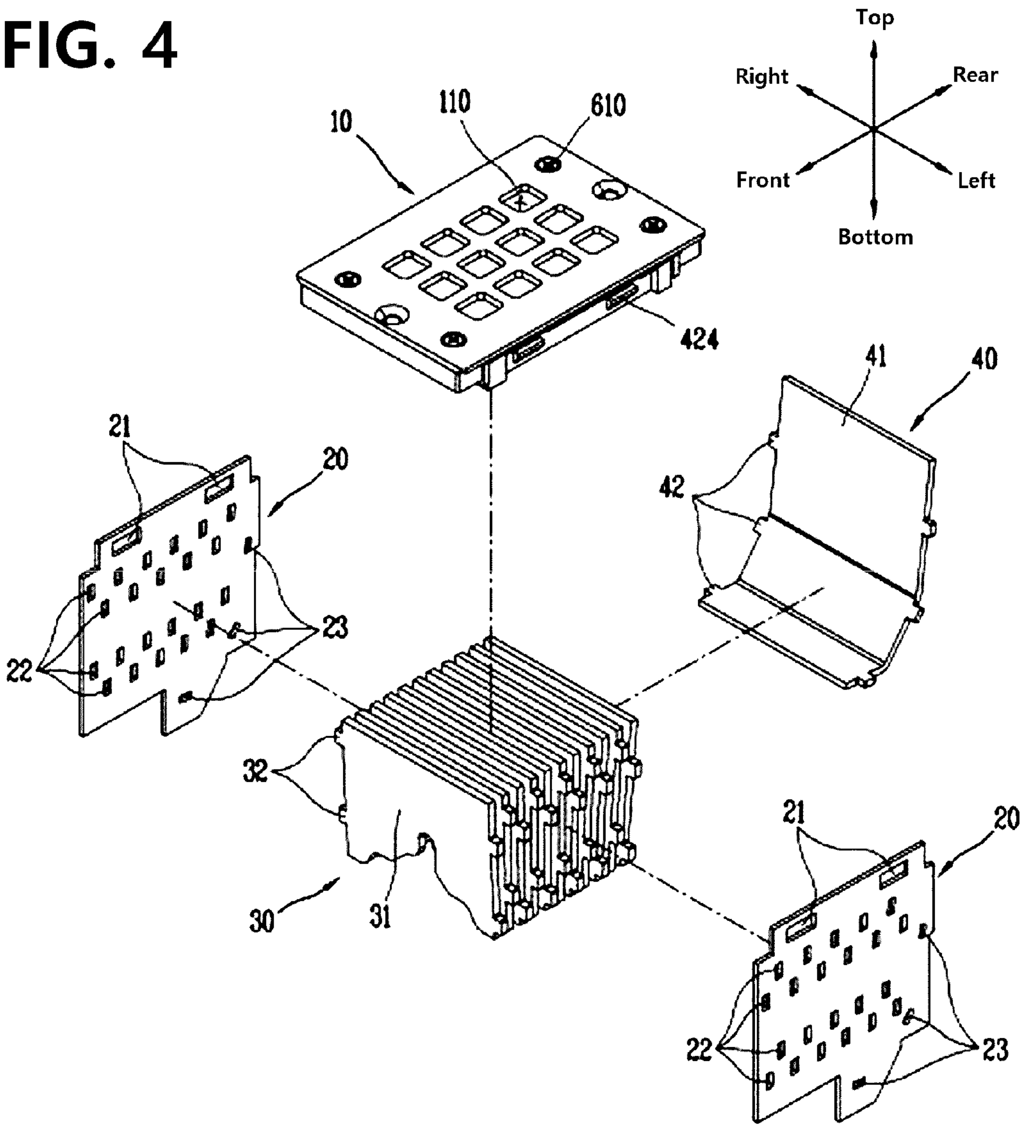
FIG. 4 is an exploded perspective view of the arc extinguishing assembly according to FIG. 3.
Figure 5:
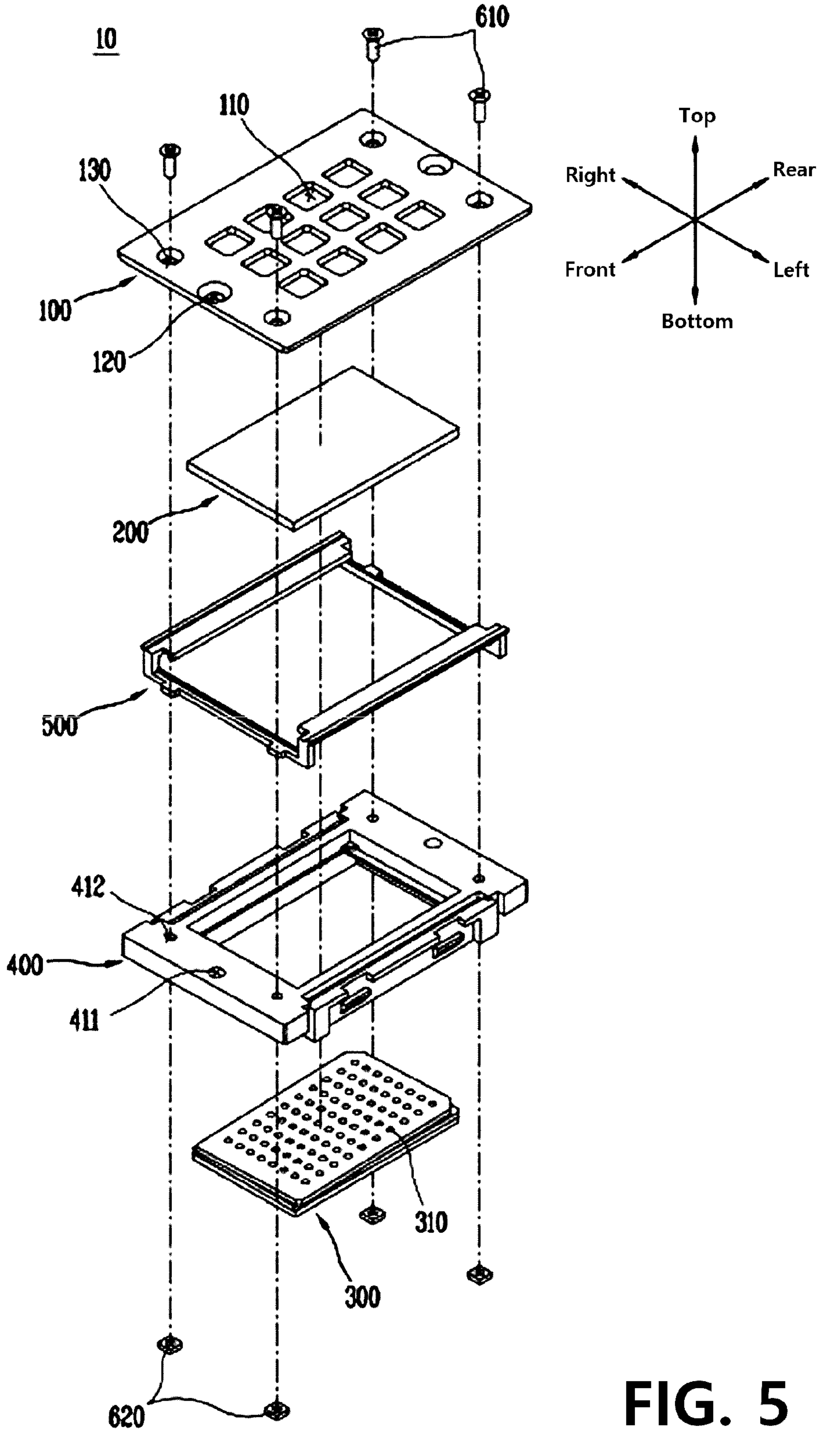
FIG. 5 is an exploded perspective view of the exhaust according to FIG. 4.

Referring to FIG. 3, a circuit breaker 1 configured to block the flow of current when an abnormal current occurs is illustrated.

The circuit breaker 1 includes a circuit breaker body 2 having an accommodation space 2*a* opened upwardly therein. An arc extinguishing assembly 3 is inserted into the accommodation space 2*a*, and the open upper side of the accommodation space 2*a* is covered by the inserted arc extinguishing assembly 3. The arc extinguishing assembly 3 is coupled with the circuit breaker body 2 around the opening of the accommodation space 2*a*.

A mounting space 2*d* into which both sides of an exhaust 10 of the arc extinguishing assembly 3 are inserted is formed to be recessed on the front and rear sides of the opening of the accommodation space 2*a*.

Both sides, the front side and the rear side of the exhaust 10 are respectively inserted into the mounting space 2*d* and supported by the first coupling surface 2*b*1 and the third coupling surface 2*b*3. Specifically, the exhaust 10 is supported up and down by the first coupling surface 2*b*1, and supported to the left and right by the third coupling surface 2*b*3.

A cover mounting groove 2*e* into which both sides of the exhaust cover 100 (refer to FIG. 5) of the exhaust 10 are recessed is formed to be recessed on the left and right sides of the opening of the accommodation space 2*a*.

Both sides, left and right sides of the exhaust cover 100 are respectively inserted into the cover mounting groove 2*e* and supported by the second coupling surface 2*b*2. Specifically, the exhaust cover 100 is supported vertically by the cover mounting groove 2*e*.

A mounting space coupling groove 2*c* for coupling the arc extinguishing assembly 3 to the mounting space 2*d* is formed to be recessed in the mounting space 2*d*. Specifically, a mounting space coupling groove (2*c*) is formed to be recessed in the center of the first coupling surface 2*b*1.

One end of the arc extinguishing assembly fastening member 4 penetrating through the front side and the rear side of the exhaust 10 is inserted and coupled to the mounting space coupling groove 2*c*.

The exhaust 10 is coupled to the circuit breaker body 2 by a fastening force between the arc extinguishing assembly fastening member 4 and the mounting space coupling groove 2*c*. That is, the arc extinguishing assembly 3 and the circuit breaker body 2 are coupled by a fastening force of the arc extinguishing assembly fastening member 4 and the mounting space coupling groove 2*c*.

A stationary contact (not illustrated) and a movable contact (not illustrated) are provided in the accommodation space 2*a* of the circuit breaker body 2 to cut off or energize a power supply side and a load side.

The stationary contact is connected to a power supply side, and the movable contact is connected to a load side.

The stationary contact and the movable contact are disposed on the lower side of the arc extinguishing assembly 3.

When a normal current flows in the circuit, the stationary contact and the movable contact are in contact with each other to conduct electricity, thereby causing a current to flow between the power supply side and the load side.

When an abnormal current flows in the circuit, the movable contact is rotated by a predetermined angle in a direction away from the stationary contact. Accordingly, the stationary contact and the movable contact are spaced apart from each other, and the flow of current between the power source side and the load side is blocked.

Since the structures of the movable contact and the stationary contact for energizing or cutting off the power supply side and the load side are known techniques, the detailed descriptions of the structures will be omitted.

When an abnormal current is generated and the stationary contact and the movable contact are spaced apart from each other, an arc is generated between the stationary contact and the movable contact. In this case, the arc is a plasma of high-temperature electrons and ions, and if it is not extinguished quickly, damage to the components constituting the circuit breaker may occur. Therefore, it is preferable that the arc generated between the stationary contact and the movable contact is sufficiently extinguished through the arc extinguishing assembly 3 located above the stationary contact and the movable contact.

The arc is moved upwards and extended in the grid 30 (refer to FIG. 4) and the arc runner 40 (refer to FIG. 4) inside the arc extinguishing assembly 3, and then discharged to the outside through the center of the exhaust section 10 of the circuit breaker 1. When an arc is generated, the pressure inside the accommodation space 2*a* is temporarily increased by the metal gas generated between the stationary contact and the movable contact. In order for the arc to be sufficiently pushed upward and extended, the amount of temporary pressure increase in the accommodation space 2*a* must be sufficiently formed before the arc is discharged through the center of the exhaust 10.

When the fluid in the accommodation space 2*a* leaks through the gap between the exhaust 10 and the coupling surfaces 2*b*1, 2*b*2, 2*b*3, problems may occur in that the amount of temporary pressure increase inside the accommodation space 2*a* is insufficient when an arc is generated. As a result, the arc cannot be sufficiently pushed upwards, and problems may occur in that the extension length of the arc is shortened.

In consideration of this problem, a structure for improving the arc extinguishing performance by increasing the force pushing the arc upward is required. That is, a structure capable of suppressing leakage of the fluid inside the accommodation space 2*a* between the exhaust 10 and the coupling surfaces 2*b*1, 2*b*2, 2*b*3 is required. In other words, a structure capable of sealing the gap between the exhaust 10 and the coupling surfaces 2*b*1, 2*b*2, 2*b*3 is required.

The arc extinguishing assembly 3 according to an exemplary embodiment of the present disclosure is provided with a sealing member 500 for sealing the gap between the exhaust 10 and the coupling surfaces 2*b*1, 2*b*2, 2*b*3, and in this regard, it will be described in detail below.

3. Description of the Arc Extinguishing Assembly 3 According to an Exemplary Embodiment of the Present Disclosure Referring to FIG. 4, the arc extinguishing assembly 3 includes an exhaust 10, a side portion 20, a grid 30 and an arc runner 40.

A pair of plate-shaped side portions 20 are coupled to the left and right sides of the exhaust 10, and a grid 30 and an arc runner 40 are coupled between the plate-shaped side portions 20.

After the arc generated from the lower side of the arc extinguishing assembly 3 is extended in the grid 30 and the arc runner 40, it is discharged to the outside of the circuit breaker 1 through the exhaust 10.

Hereinafter, each configuration will be described. However, after a brief description of the exhaust 10, it will be described in more detail in a separate table of contents.

(1) Description of the Exhaust 10

First, the exhaust 10 will be described.

The exhaust 10 has a substantially rectangular shape. The exhaust 10 includes an exhaust body 400 and an exhaust cover 100 covering an upper surface of the exhaust body 400.

In an exemplary embodiment, the exhaust cover 100 may be formed in a size that can cover all of the upper surface of the exhaust body 400. That is, the exhaust cover 100 may have a larger area than the exhaust body 400.

A gas outlet 110 through which an arc can be emitted is formed in the center portion of the exhaust cover 100. In an exemplary embodiment, the gas outlet 110 may be formed in plurality.

Snap protrusions 424 for coupling with the side portions 20 are formed to protrude on both sides (left and right) of the exhaust body 400. A pair of side portions 20 are coupled to the left and right sides of the exhaust body 400, respectively.

(2) Description of the Side Portion 20

Next, the side portion 20 will be described.

The side portion 20 are provided in a pair and is formed in a plate shape. The side portions 20 are positioned to face each other, and a grid 30 and an arc runner 40 to be described below are disposed between the side portions 20 and are coupled to the side portions 20.

A plurality of grid fastening holes 22 and arc runner fastening holes 23 are formed through the center of the side portion 20. A grid fastening protrusion 32 and an arc runner fastening protrusion 42 to be described below are respectively inserted into the grid fastening hole 22 and the arc runner fastening hole 23.

Herein, the grid fastening hole 22 and the arc runner fastening hole 23 are formed to have a size corresponding to the grid fastening protrusion 32 and the arc runner fastening protrusion 42 or a slightly smaller size. Accordingly, the grid fastening protrusions 32 and the arc runner fastening protrusions 42 may be press-fitted into the grid fastening holes 22 and the arc runner fastening holes 23, and the side portions 20, the grid 30 and the arc runner 40 may be combined.

In the illustrated exemplary embodiment, the grid fastening hole 22 and the arc runner fastening hole 23 are formed in a rectangular shape, but this may vary depending on the shapes of the grid fastening protrusion 32 and the arc runner fastening protrusion 42.

At the upper side of the side portion 20, the exhaust 10 is coupled between the side portions 20.

A snap fastening hole 21 for coupling with the exhaust 10 is formed to penetrate through the upper side of the side portion 20.

A pair of side portions 20 are slidably moved to the left and right side surfaces of the exhaust 10 in order to be coupled to the exhaust 10. When the side portion 20 is moved, the snap protrusions 424 protruding from the left and right sides of the exhaust body 400 are inserted into and coupled to the snap fastening holes 21.

Herein, the snap protrusion 424 is formed to be inclined in the insertion direction of the side portion 20. Accordingly, insertion of the snap protrusion 424 into the snap fastening hole 21 becomes easy. In addition, in a state where the snap protrusion 424 is inserted into the snap fastening hole 21, the side portion 20 is not arbitrarily moved downward of the exhaust body 400.

In the illustrated exemplary embodiment, the snap fastening hole 21 is formed in a rectangular shape, but this may vary depending on the shape of the snap protrusion 424.

(3) Descriptions of the Grid 30 and Arc Runner 40

Next, the grid 30 will be described.

The grid 30 is formed in a plate shape, and is spaced apart from the front side by a predetermined distance from the rear side to be stacked in plurality. The grid 30 includes a grid body 31 and grid fastening protrusions 32 protruding from both sides of the grid body 31.

The grid fastening protrusions 32 protruding from both sides are inserted into the grid fastening holes 22, whereby the grid 30 may be fixed between the pair of side portions 20. The grid 30 may be formed of any material capable of applying electromagnetic attraction to the arc. In an exemplary embodiment, the grid 30 may be formed of an iron (Fe) material.

The arc is extended and moved between the plurality of grids 30. Accordingly, the arc voltage is increased, and the arc is cooled.

Next, the arc runner 40 will be described.

The arc runner 40 is formed in a plate shape, and is spaced apart from the plurality of grids 30 by a predetermined distance to the rear side.

The arc extends to the lower end of the arc runner 40 and flows along the arc runner 40. If the arc does not reach the arc runner 40, the arc extinguishing performance may be reduced. In consideration of this point, it is preferable to shorten the distance between the arc generation position and the arc runner 40.

To this end, the lower end of the arc runner 40 is bent toward the front side.

The arc runner 40 may be formed of any material capable of applying electromagnetic attraction to the arc. In an exemplary embodiment, the arc runner may be formed of an iron (Fe) material.

4. Description of the Configuration of the Exhaust 10 According to an Exemplary Embodiment of the Present Disclosure Next, the configuration of the exhaust 10 will be described with reference to FIGS. 5 to 9.

The exhaust 10 includes an exhaust cover 100, a filter 200, an insulation plate 300 and an exhaust body 400. The exhaust body 400 is provided with a sealing member 500 for sealing a gap between the exhaust 10 and the circuit breaker 1.

(1) Description of the Exhaust Cover 100

The exhaust cover 100 has a plate shape. The exhaust cover 100 is coupled to the upper surface of the exhaust body 400 to cover the upper surface of the exhaust body 400.

A gas outlet 110 for discharging the extinguished arc is formed to penetrate through the center of the exhaust cover 100. In an exemplary embodiment, the gas outlet 110 may be formed in plurality.

A first cover coupling hole 120 and a second cover coupling hole 130 for coupling with the exhaust body 400 are formed through both sides of the exhaust cover 100. In the illustrated exemplary embodiment, the first cover coupling hole 120 and the second cover coupling hole 130 are formed on the front and rear sides of the exhaust cover 100.

In the illustrated exemplary embodiment, the first cover coupling hole 120 is formed in the center of the front side and the rear side of the exhaust cover 100, respectively. That is, two first cover coupling holes 120 may be provided.

In the illustrated exemplary embodiment, the second cover coupling hole 130 is formed in each corner of the exhaust cover 100. That is, four second cover coupling holes 130 may be provided.

(2) Descriptions of the Filter 200 and the Insulation Plate 300

The filter 200 is inserted and accommodated in the accommodation portion 420*a* formed through the center of the exhaust body 400. A support portion 421 is formed to protrude from the front and rear sides of the accommodation portion 420*a* to support the inserted filter 200.

In an exemplary embodiment, the filter 200 may be formed of a material having pores through which a fluid can pass therein. In addition, the filter 200 may be formed by stacking a plurality of plates having pores through which a fluid can pass therein.

The filter 200 accommodated in the accommodation portion 420*a* is covered by the exhaust cover 100. When an arc is generated, the fluid in the accommodation space 2*a* passes through the filter 200 and then through the gas outlet 110 to be discharged to the outside of the circuit breaker 1.

The insulation plate 300 is a plate-shaped member through which a plurality of exhaust holes 310 are formed. The insulation plate 300 is fitted and fixed to the accommodation portion 420*a* from the lower side of the supporting part 421.

In an exemplary embodiment, the insulation plate 300 may be formed by stacking a plurality of insulation plate-shaped members. In the exhaust 10, the insulation plate 300, the filter 200 and the exhaust cover 100 are sequentially disposed from the lower side to the upper side. As a result, the extinguished arc is discharged to the outside of the circuit breaker 1 through the exhaust hole 310, the pores of the filter 200 and the gas outlet 110.

(3) Description of the Exhaust Body 400

Next, the exhaust body 400 will be described with reference to FIGS. 6 and 7.

Figure 6:
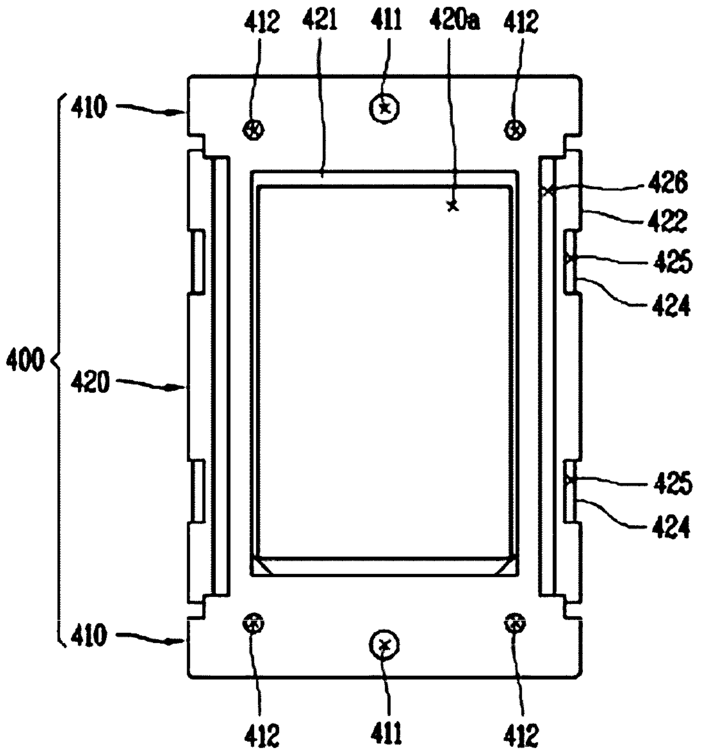
FIG. 6 is a plan view and a perspective view of the exhaust body according to FIG. 5.
Figure 6:
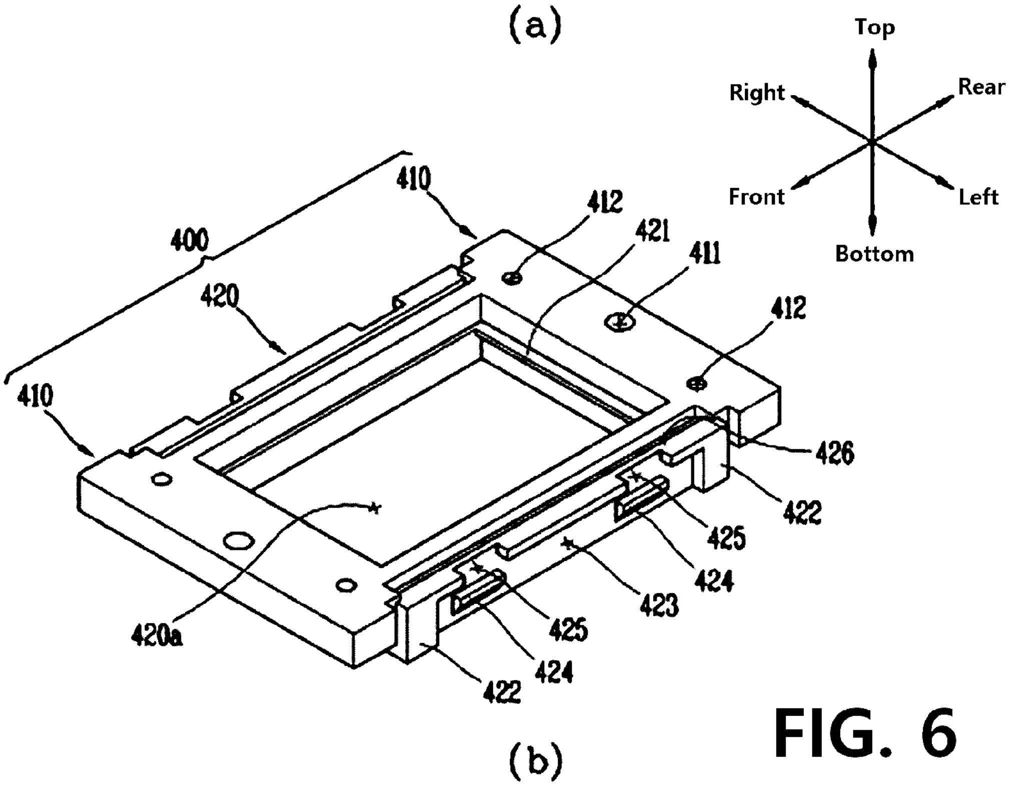
Figure 7:
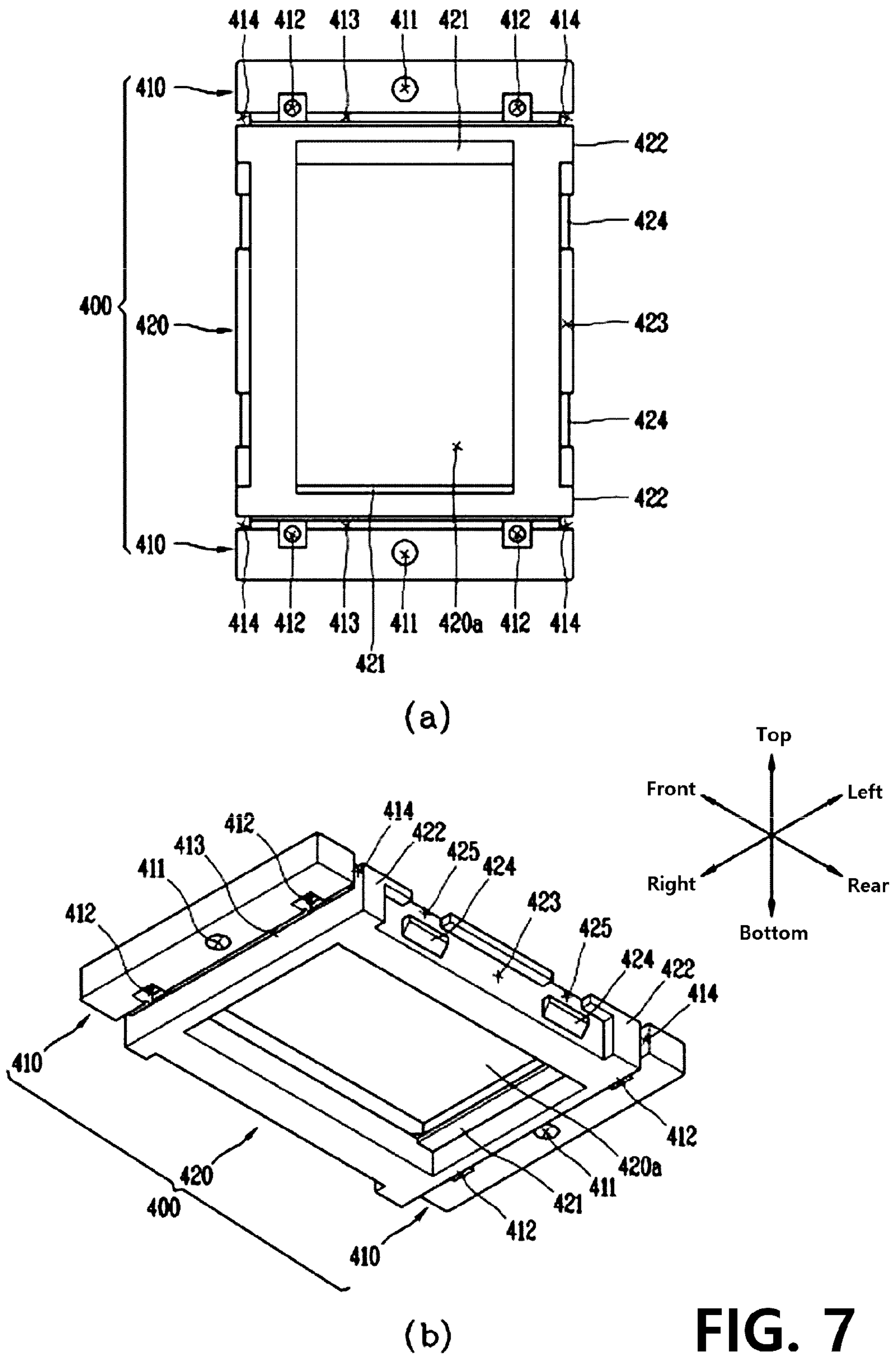
FIG. 7 is a rear view and a perspective view of the exhaust body according to FIG. 5.

Referring to FIG. 6, a plan view showing an upper side surface of the exhaust body 400 and a perspective view showing an upper side surface thereof are illustrated. Referring to FIG. 7, a rear view showing a lower side of the exhaust body 400 and a perspective view showing a lower side thereof are illustrated.

The exhaust body 400 includes a frame 420 through which the accommodation portion 420*a* is formed in the center and mounting portions 410 formed to protrude from both sides of the frame 420. In an exemplary embodiment, the exhaust body 400 may be formed in a substantially rectangular ring shape.

The mounting portion 410 is formed to protrude from the front side and the rear side of the frame portion 420, and is respectively inserted into the mounting space 2*d* of the circuit breaker body 2. The inserted mounting portion 410 is supported by the first coupling surface 2*b*1 and the third coupling surface 2*b*3 of the mounting space 2*d*.

In an exemplary embodiment, the mounting portion 410 may be formed in a size corresponding to the mounting space 2*d*. In order to prevent the fluid in the accommodation space 2*a* from leaking between the mounting portion 410 and the mounting space 2*d*, the mounting portion 410 is preferably formed in a size similar to that of the mounting space 2*d*.

A first mounting portion coupling hole 411 is formed through the center of the mounting portion 410. In a state where the mounting portion 410 is inserted into the mounting space 2*d*, the arc extinguishing assembly fastening member 4 sequentially passes through the first cover coupling hole 120 and the first mounting portion coupling hole 411.

One end of the penetrating arc extinguishing assembly fastening member 4 is inserted into and coupled to the mounting space coupling groove 2*c*. Accordingly, the exhaust cover 100 and the exhaust body 400 are pressed toward the mounting space coupling groove 2*c* by the arc extinguishing assembly fastening member 4.

That is, the exhaust 10 is coupled to the circuit breaker body 2 by a fastening force between the arc extinguishing assembly fastening member 4 and the mounting space coupling groove 2*c*.

A second mounting portion coupling hole 412 for coupling with the exhaust cover 100 is formed to penetrate through the left and right sides of the mounting portion 410. The lower end of the second mounting portion coupling hole 412 is formed in a square columnar space.

The fastening nut 620 is inserted into the lower end of the second mounting portion coupling hole 412, and one end of the fastening bolt 610 penetrating through the second cover coupling hole 130 and the second mounting portion coupling hole 412 is fastened with the fastening nut 620. Accordingly, the exhaust cover 100 and the exhaust body 400 are pressed to each other by the fastening bolt 610 and the fastening nut 620. Accordingly, the exhaust body 400 and the exhaust cover 100 may be firmly coupled to each other.

A first sealing portion insertion groove 413 into which a first sealing portion 510, which will be described below, is inserted, is formed to be recessed in a part of the lower surface of the mounting portion 410 connected to the frame portion 420 to be described below.

In addition, a third sealing portion insertion groove 414 into which a third sealing portion 530, which will be described below, is inserted, is formed to be recessed in a part of the left and right side surfaces of the mounting portion 410 connected to the frame portion 420 to be described below.

The first sealing portion insertion groove 413 is formed over the entire length of the left and right sides of the mounting portion 410 and is connected to the third sealing portion insertion groove 414.

Side coupling portions 422 are formed on both sides of the frame portion 420, respectively. In an exemplary embodiment, the upper surface of the side coupling portion 422 may be formed to be lower than a part of the adjacent frame portion 420. That is, the upper surface of the side coupling portion 422 may be formed to have a step difference from the upper surface of the adjacent frame portion 420.

A second sealing portion 520, which will be described below, is located in the stepped space.

In the side coupling portion 422, the side coupling space 423 into which the side portion 20 is inserted is formed to be recessed, respectively. In an exemplary embodiment, the side portion coupling space 423 may be formed to have a size corresponding to the upper side of the side portion 20.

Snap protrusions 424 are formed to protrude from the side coupling space 423. Accordingly, when the side portion 20 is inserted, the snap protrusion 424 is inserted into the snap fastening hole 21, and as a result, the arbitrarily upward and downward movement of the side portion 20 may be restricted.

A first insertion groove 425 for fixing a second sealing portion 520 to be described below is formed on the upper side of the side coupling space 423. In an exemplary embodiment, the first insertion groove 425 may be formed to have a size corresponding to a second protrusion 522*a* to be described below.

A second insertion groove 426 may be formed to be recessed in a part connected to a part of the adjacent frame portion 420 among parts of the upper surface of the side coupling portion 422. That is, the second insertion groove 426 may be formed to be recessed in the part closest to the accommodation space 420*a* among parts of the upper surface of the side coupling portion 422.

A hook insertion portion 521 to be described below is inserted into the second insertion groove 426, and the second insertion groove 426 is formed by a predetermined length in the front and rear sides. In an exemplary embodiment, the predetermined length may be a length corresponding to the length of the hook insertion portion 521.

A second sealing portion 520 to be described below is inserted between the upper surface of the side coupling portion 422 and the exhaust cover 100 described above.

(4) Description of the Sealing Member 500

Next, the sealing member 500 will be described with reference to FIGS. 8 and 9.

Figure 8:
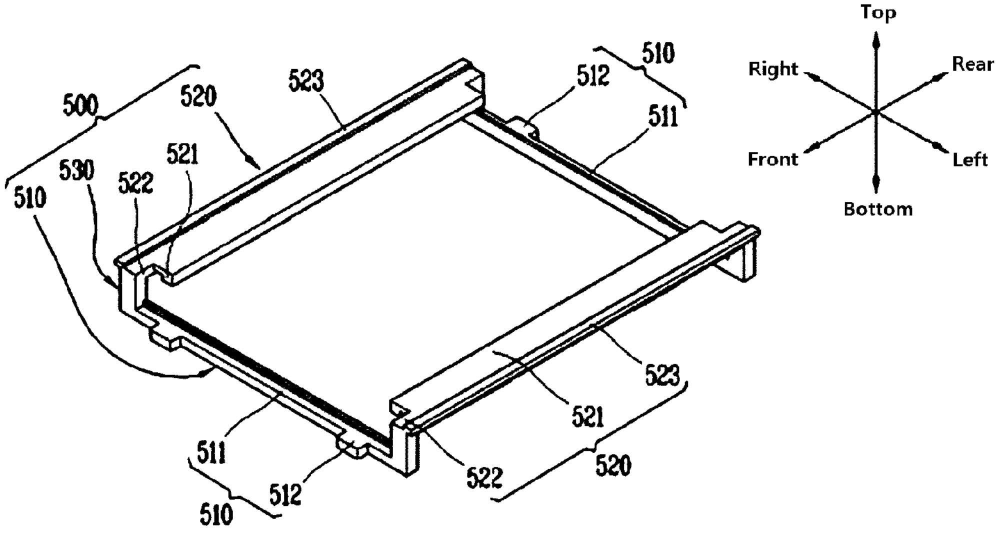
FIG. 8 is a perspective view of the sealing member according to FIG. 5.
Figure 8:
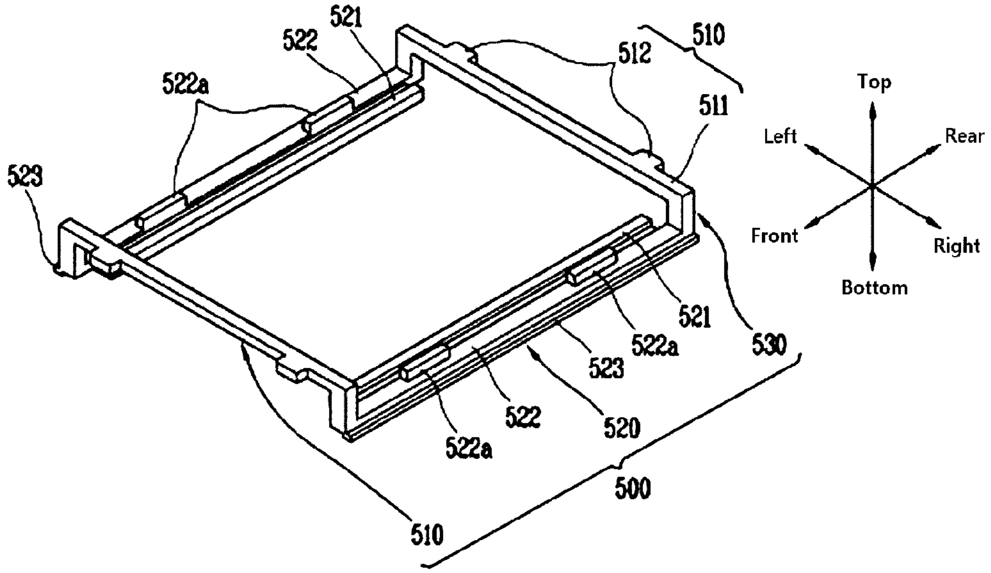
Figure 9:
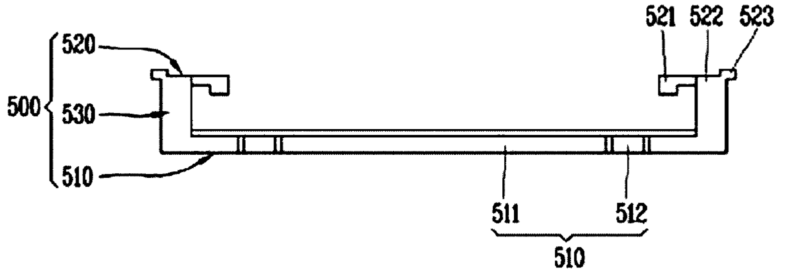
FIG. 9 is a front view and a side view of the sealing member according to FIG. 5.
Figure 9:
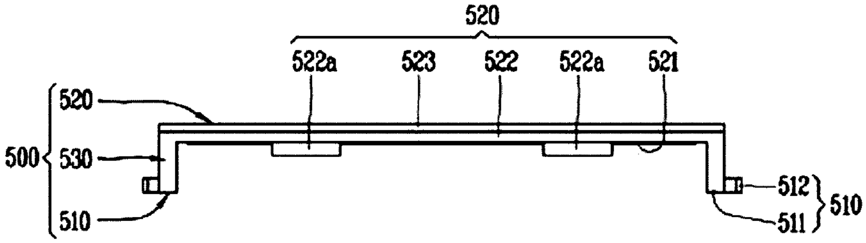

Referring to FIG. 8, a perspective view of the sealing member 500 is illustrated, and referring to FIG. 9, a front view and a side view of the sealing member 500 are illustrated.

The sealing member 500 is a member coupled to the exhaust body 400 to seal a gap generated between the exhaust 10 and the circuit breaker body 2. In an exemplary embodiment, the sealing member 500 may be formed of an insulating material having an elastic force. In addition, the sealing member 500 may be formed of a material that can be elastically deformed by an applied pressure.

The sealing member 500 includes a first sealing portion 510, a second sealing portion 520 and a third sealing portion 530.

The first sealing portions 510 are formed to extend a predetermined distance in one direction, and are provided as a pair and are spaced apart from each other. In the illustrated exemplary embodiment, the one direction may be defined as a left and right direction, and the pair of first sealing portions 510 are spaced apart from each other in the front and rear sides.

The second sealing portions 520 are formed to extend by a predetermined distance in one direction, and are provided as a pair and are spaced apart from each other. In the illustrated exemplary embodiment, the one direction may be defined as a front and rear direction, and the pair of second sealing portions 520 are spaced apart from each other in the left and right sides.

The third sealing portions 530 are formed to extend a predetermined distance in one direction to connect both ends of the first sealing portion 510 and the second sealing portion 520, respectively. In the illustrated exemplary embodiment, the one direction may be defined as an up and down direction, and four third sealing portions 530 may be provided.

That is, in the sealing member 500, a pair of second sealing portions 520 spaced apart from each other by a predetermined distance on the left and right sides and a pair of first sealing portions 510 spaced apart from each other by a predetermined distance on the front and back sides may be formed in the form of a square ring disposed to be vertically spaced apart. Each of the sealing portions 510, 520, 530 functions to seal a gap between the exhaust body 400 and the mounting space 2*d*, a gap between the exhaust cover 100 and the cover mounting groove 2*e* or a gap between the exhaust cover 100 and the exhaust body 400.

First, the first sealing portion 510 includes a first base portion 511 extending left and right by a predetermined length and a first protrusion part 512 protruding from the first base portion 511.

The first base portion 511 is inserted into the first sealing portion insertion groove 413, and the first protrusion part 512 is inserted into the space below the second mounting portion coupling hole 412.

In addition, the third sealing portion 530 is inserted into the third sealing portion insertion groove 414.

In addition, the second sealing portion 520 includes a second base portion 522 formed to extend in front and rear by a predetermined length, a hook insertion portion 521 formed to protrude from the second base portion 522 toward the accommodation portion 420*a*, and a wing 523 formed to protrude from the second base portion 522 in a direction away from the accommodation portion 420*a*.

The hook insertion portion 521 has a cross-section of a shape which protrudes downward by a predetermined length after extending by a predetermined length toward the accommodation portion 420*a*. That is, it has a (¬)-shaped or left and right inverted (¬)-shaped cross section (refer to FIG. 9*a*).

The downwardly protruding part of the hook insertion portion 521 is inserted into the second insertion groove 426 of the frame portion 420 of the exhaust body 400. Accordingly, the second sealing portion 520 may be more firmly fixed between the exhaust cover 100 and the exhaust body 400.

In addition, the second base portion 522 has a rectangular cross section, and a second protrusion part 522*a* is formed to protrude downward from the lower side of the second base portion 522.

The second base portion 522 is disposed between the upper surface of the side coupling portion 422 and the exhaust cover 100, and the second protrusion 522*a* is inserted into the first insertion groove 425. In an exemplary embodiment, the second protrusion 522*a* may be formed to have a size corresponding to that of the first insertion groove 425.

In addition, the wing 523 is formed to protrude upward and away from the accommodation portion 420*a* in the second base portion 522. In an exemplary embodiment, the wing 523 may be formed to have the same length in the front and rear sides as the second base portion 522. The wing 523 is inserted between the cover mounting groove 2*e* and the exhaust cover 100.

5. Description of the Sealing Structure of the Circuit Breaker 1 According to an Exemplary Embodiment of the Present Disclosure Next, the sealing structure of the circuit breaker 1 according to the present exemplary embodiment will be described with reference to FIGS. 10 to 16.

Figure 10:
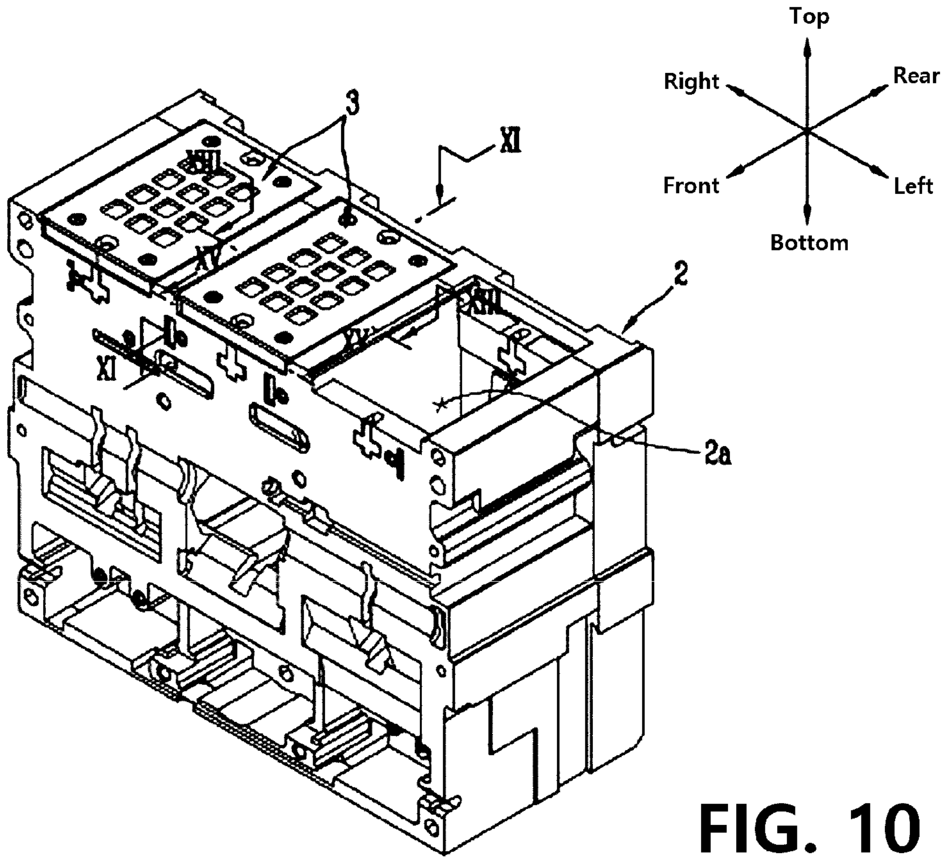
FIG. 10 is a perspective view of the circuit breaker according to an exemplary embodiment of the present disclosure.

Referring to FIG. 10, the circuit breaker 1 with the arc extinguishing assembly 3 coupled thereto is illustrated. In the illustrated figure, a part of the entire arc extinguishing assembly 3 is omitted.

Figure 11:
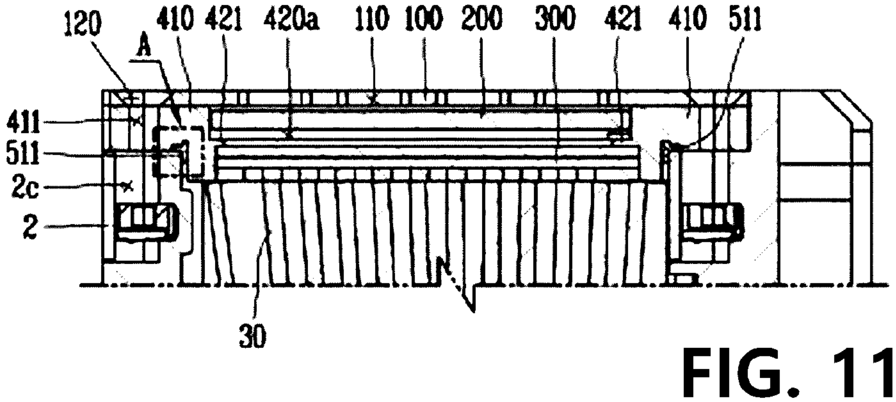
FIG. 11 is a cross-sectional view of the circuit breaker according to FIG. 10 taken along line XI-XI.

Referring to FIG. 11, a cross-sectional view of the upper surface of the circuit breaker 1 taken in the vertical direction along the line XI-XI is illustrated. The sealing structure by the first sealing portion 510 is illustrated in FIG. 11.

Figure 13:
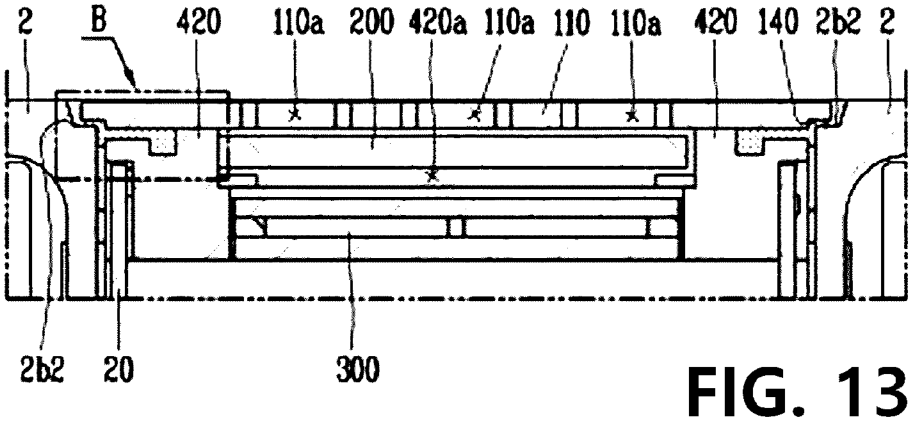
FIG. 13 is a cross-sectional view of the circuit breaker according to FIG. 10 taken along line XIII-XIII.

Referring to FIG. 13, a cross-sectional view of the upper surface of the circuit breaker 1 taken in the vertical direction along the line XIII-XIII is illustrated. The sealing structure by the second sealing portion 520 is illustrated in FIG. 13.

Figure 15:
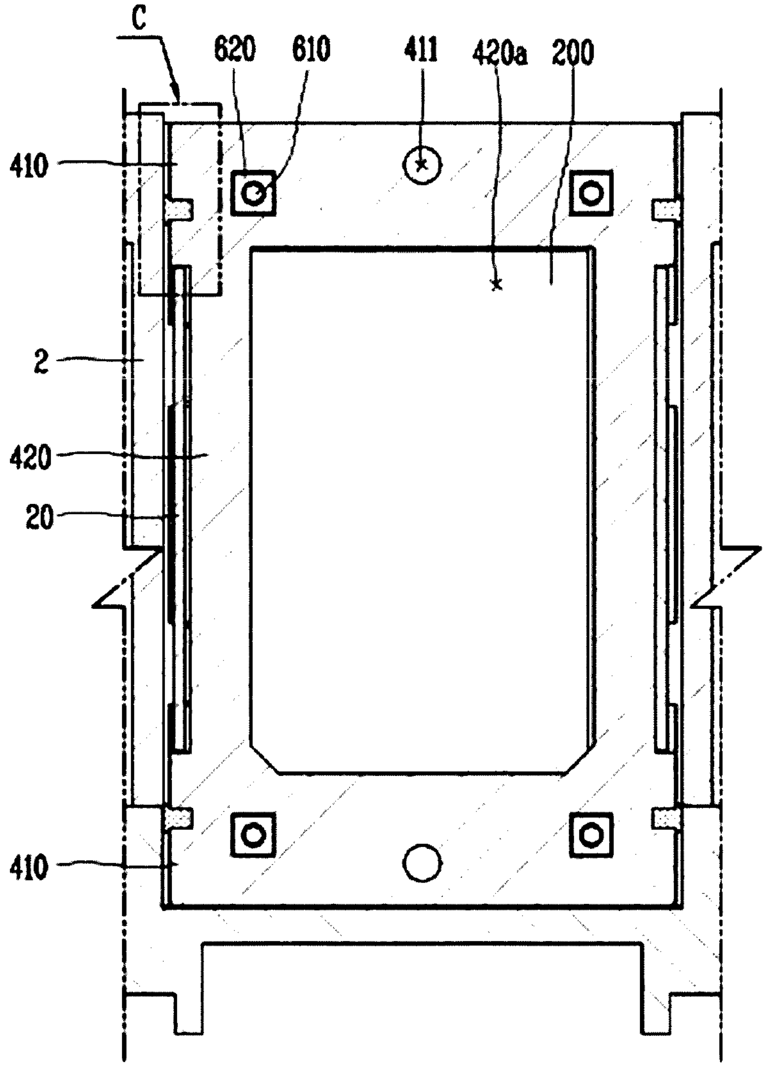
FIG. 15 is a cross-sectional view of the circuit breaker according to FIG. 10 taken along line XV-XV.

Referring to FIG. 15, a cross-sectional view of the front side of the circuit breaker 1 taken along the line XV-XV in the front-rear direction is illustrated. The sealing structure by the third sealing portion 530 is illustrated in FIG. 15.

(1) Description of the Sealing Structure by the First Sealing Portion 510

Referring to FIG. 11, when the arc extinguishing assembly 3 and the circuit breaker body 2 are coupled, a space (gap) is generated between the lower surface of the mounting portion 410 and the first coupling surface 2*b*1, and in the space, the first sealing portion 510 is inserted and elastically deformed. This is illustrated in area A.

Figure 12:
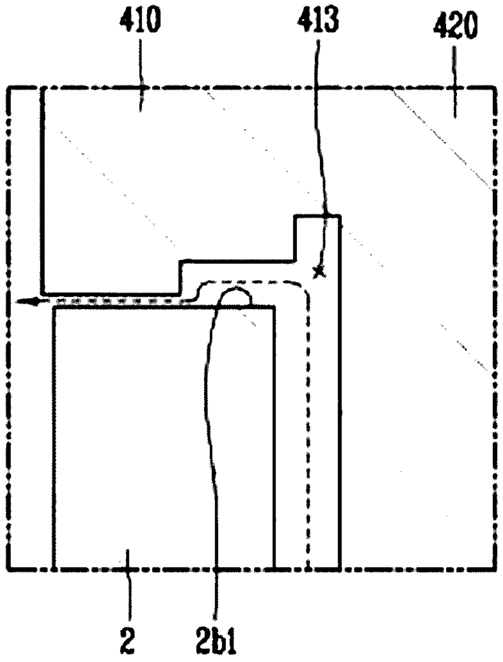
FIG. 12 is an enlarged cross-sectional view of area A of FIG. 11.
Figure 12:
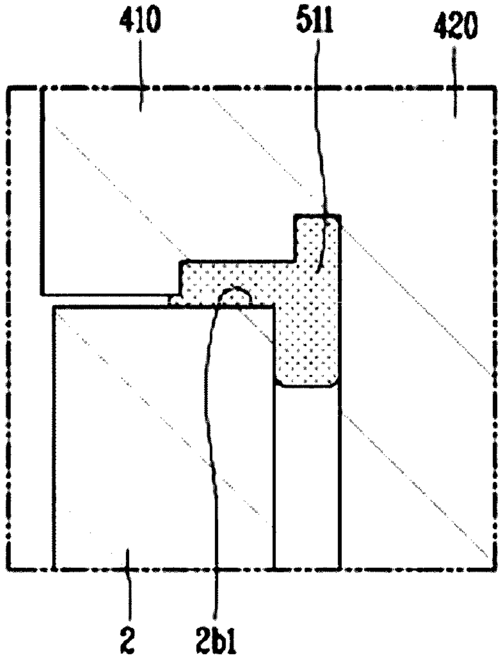

Referring to FIG. 12, an enlarged cross-sectional view of area A is illustrated. FIG. 12(*a*) is a cross-sectional view illustrating area A in a state where the first sealing portion 510 is removed, and FIG. 12(*b*) is a cross-sectional view illustrating area A in a state where the first sealing portion 510 is inserted.

Referring FIG. 12(*a*), even if the exhaust body 400 and the first coupling surface (2*b*1) are pressed together by a strong fastening force, when the internal pressure of the accommodation space 2*a* increases, a fluid may leak between the exhaust body 400 and the first coupling surfaces 2*b*1. In the illustrated exemplary embodiment, a path through which the fluid may leak is indicated by a dashed arrow.

Referring to FIG. 12(*b*), in order to prevent such fluid leakage, a first sealing portion 510 is provided between the exhaust body 400 and the first coupling surface 2*b*1.

When the exhaust body 400 is coupled, the first sealing portion 510 is pressed between the exhaust body 400 and the first coupling surface 2*b*1 to elastically deform.

In an exemplary embodiment, the first sealing portion 510 may be formed in a size that can be elastically deformed by being pressed between the exhaust body 400 and the first coupling surface 2*b*1.

In an exemplary embodiment, the volume of the first base portion 511 may be formed to be larger than that of the first sealing portion insertion groove 413.

In an exemplary embodiment, the size of the cross-sectional area of the first base portion 511 may be formed to be larger than that of the first sealing portion insertion groove 413.

The elastically deformed first sealing portion 510 is in close contact with the lower surfaces of the first coupling surface 2*b*1 and the mounting portion 410 by pressing the lower surfaces of the first coupling surface 2*b*1 and the mounting portion 410.

Accordingly, the gap between the first coupling surface 2*b*1 and the exhaust body 400 is sealed, and the fluid in the accommodation space 2*a* may be suppressed from leaking into the gap between the first coupling surface 2*b*1 and the exhaust body 400.

(2) Description of the Sealing Structure by the Second Sealing Portion 520

Referring to FIG. 13, when the arc extinguishing assembly 3 and the circuit breaker body 2 are coupled, a space (gap) may be generated between the upper surface of the mounting portion 410 and the exhaust cover 100 and between the second coupling surface 2*b*2 and the lower surface of the exhaust cover 100. The second sealing portion 520 is inserted into the space and elastically deformed. This is illustrated in area B.

Figure 14:
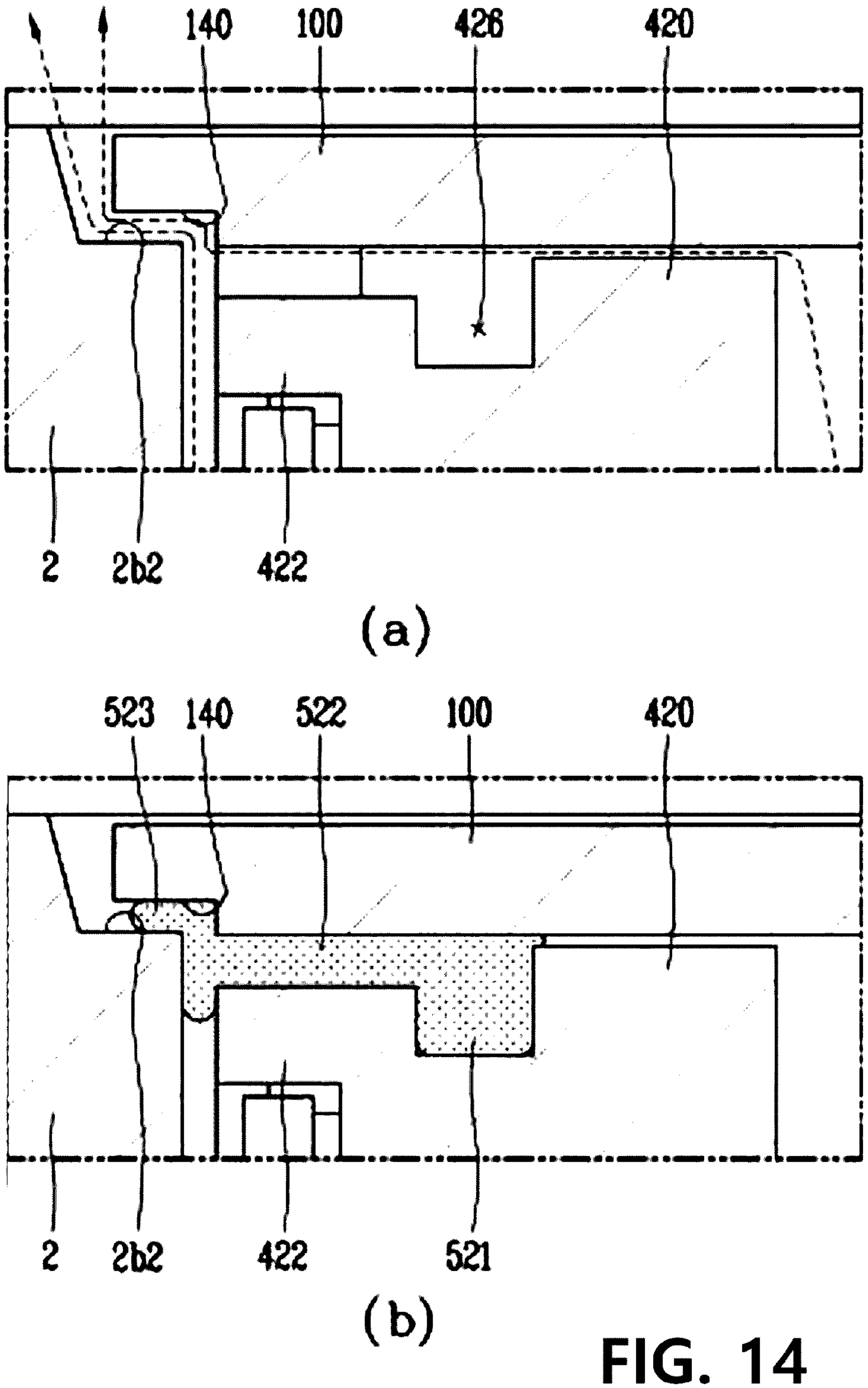
FIG. 14 is an enlarged cross-sectional view of area B of FIG. 13.

Referring to FIG. 14, an enlarged cross-sectional view of area B is illustrated. FIG. 14(*a*) is a cross-sectional view illustrating area B in a state where the second sealing portion 520 is removed, and FIG. 14(*b*) is a cross-sectional view illustrating area B in a state where the second sealing portion 520 is inserted.

Referring to FIG. 14(*a*), even if the upper surface of the mounting portion 410 and the exhaust cover 100 and the second coupling surface 2*b*2 and the exhaust cover 100 are pressed to each other by a strong fastening force, if the internal pressure of the accommodation space 2*a* is increased, a fluid may leak therebetween. In the illustrated exemplary embodiment, a path through which the fluid may leak is indicated by a dashed arrow.

Referring to FIG. 14(*b*), in order to prevent such fluid leakage, a second sealing portion 520 is provided between the upper surface of the mounting portion 410 and the exhaust cover 100, and between the second coupling surface 2*b*2 and the lower surface of the exhaust cover 100.

When the exhaust body 400 and the exhaust cover 100 are coupled, the second base portion 522 and the hook insertion portion 521 are pressed between the upper surface of the side coupling portion 422 and the lower surface of the exhaust cover 100 to be elastically deformed.

In addition, when the exhaust body 400 and the exhaust cover 100 are coupled, the second base portion 522 is pressed between the side surface coupling portion 422 and the inner surface of the accommodation space 2*a* facing the side coupling portion 422 to be elastically deformed.

In an exemplary embodiment, the hook insertion portion 521 may be formed in a size that can be elastically deformed by being pressed between the second insertion groove 426 and the exhaust cover 100.

In an exemplary embodiment, the volume of a part protruding downward of the hook insertion portion 521 may be formed to be larger than that of the second insertion groove 426.

In an exemplary embodiment, the cross-sectional area of a part protruding downward of the hook insertion portion 521 may be formed to be larger than that of the second insertion groove 426.

In an exemplary embodiment, the second base portion 522 may be formed in a size that can be elastically deformed by being pressed between the upper surface of the side coupling portion 422 and the lower surface of the exhaust cover 100.

In an exemplary embodiment, the second base portion 522 is pressed between the side portion coupling portion 422 and the inner surface of the accommodation space 2*a* facing the side portion coupling portion 422 to be formed to a size that can be elastically deformed.

The elastically deformed second base portion 522 and the hook insertion portion 521 press the upper surface of the side portion coupling portion 422 and the exhaust cover 100 to be in close contact with the upper surface of the side portion coupling portion 422 and the exhaust cover 100. Accordingly, the gap between the upper surface of the side coupling portion 422 and the exhaust cover 100 is sealed, and the fluid passing through the filter 200 may be suppressed from leaking into the gap.

In addition, the elastically deformed second base portion 522 presses the side coupling portion 422 and the inner surface of the accommodation space 2*a* facing the side coupling portion 422 to be in close contact with the side coupling portion 422 and the inner surface of the accommodation space 2*a* facing the side coupling portion 422. Accordingly, the gap between the side coupling portion 422 and the inner surface of the accommodation space 2*a* facing the side coupling portion 422 is sealed, and the fluid inside the accommodation space 2*a* may be suppressed from leaking into the gap.

When the exhaust body 400 and the exhaust cover 100 are coupled, the wing 523 is pressed between the cover mounting groove 2*e* and the exhaust cover 100 to be elastically deformed.

In an exemplary embodiment, a part of the exhaust cover 100 facing the cover mounting groove 2*e* is formed to be recessed by a predetermined depth in the wing receiving groove 140.

In an exemplary embodiment, the wing 523 may be formed in a size that can be elastically deformed by being pressed between the cover mounting groove 2*e* and the exhaust cover 100.

In an exemplary embodiment, the vertical thickness of the wing 523 may be formed to be greater than the value of the distance between the cover mounting groove 2*e* and the exhaust cover 100.

In an exemplary embodiment, the volume of the wing 523 may be formed to be larger than the size of the space between the cover mounting groove 2*e* and the exhaust cover 100.

In an exemplary embodiment, the cross-sectional area of the wing 523 may be formed to be larger than the area between the cover mounting groove 2*e* and the exhaust cover 100.

The elastically deformed wing 523 presses the second coupling surface 2*b*2 of the cover mounting groove 2*e* and the lower surface of the exhaust cover 100 to be in close contact with the second coupling surface 2*b*2 and the lower side surface of the exhaust cover 100. Accordingly, the gap between the second coupling surface 2*b*2 and the lower surface of the exhaust cover 100 is sealed, and the fluid inside the accommodation space 2*a* may be suppressed from leaking into the gap.

(3) Description of the Sealing Structure by the Third Sealing Portion 530

Referring to FIG. 15, when the arc extinguishing assembly 3 and the circuit breaker body 2 are coupled, a space (gap) is generated between the left and right side surfaces of the mounting portion 410 and the third coupling surface 2*b*3, and in the space, the third sealing portion 530 is inserted and elastically deformed. This is illustrated in area C.

Figure 16:
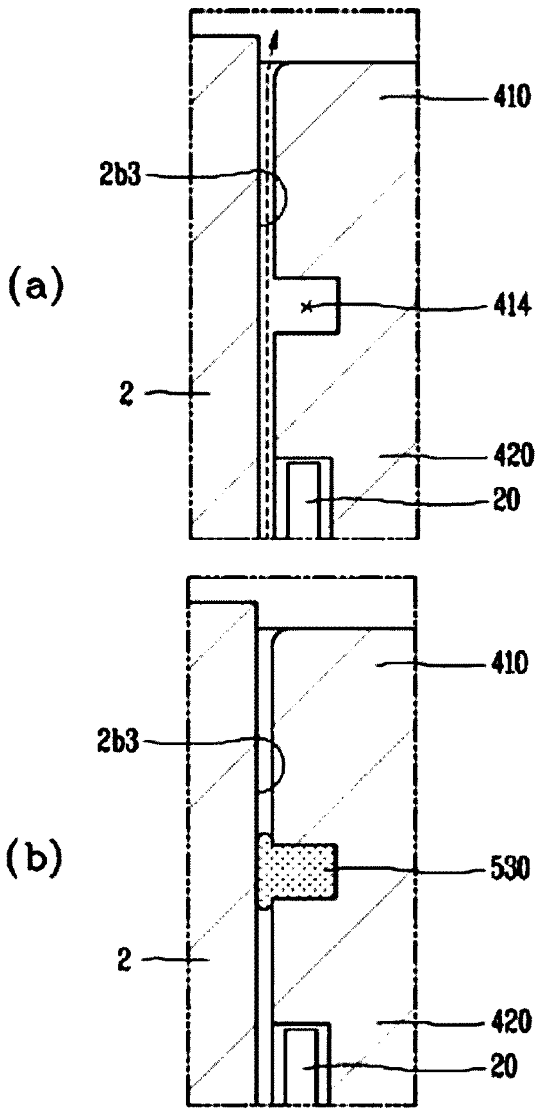
FIG. 16 is an enlarged cross-sectional view of area C of FIG. 15.

Referring to FIG. 16, an enlarged cross-sectional view of area C is illustrated. FIG. 16(*a*) is a cross-sectional view illustrating area C in a state where the third sealing unit 530 is removed, and FIG. 16(*b*) is a cross-sectional view illustrating area C in a state where the third sealing unit 530 is inserted.

Referring to FIG. 16(*a*), even when the exhaust body 400 and the third coupling surface 2*b*1 are pressed together by a strong fastening force, when the internal pressure of the accommodation space 2*a* increases, a fluid may leak between the exhaust body 400 and the third coupling surfaces 2*b*3. In the illustrated exemplary embodiment, a path through which the fluid may leak is indicated by a dashed arrow.

Referring to FIG. 16(*b*), in order to prevent the leakage of the fluid, a third sealing portion 530 is provided between the mounting portion 410 and the third coupling surface 2*b*3.

When the exhaust body 400 is coupled, the third sealing portion 530 is elastically deformed by being pressed between the third coupling surface 2*b*3 and the left and right sides of the mounting portion 410.

In an exemplary embodiment, the third sealing portion 530 may be formed in a size that can be elastically deformed by being pressed between the exhaust body 400 and the third coupling surface **2*b*3**.

In an exemplary embodiment, the volume of the third sealing portion 530 may be larger than that of the third sealing portion insertion groove 414.

In an exemplary embodiment, the size of the cross-sectional area of the third sealing portion 530 may be larger than that of the third sealing portion insertion groove 414.

The elastically deformed third sealing portion 530 presses the left and right side surfaces of the third coupling surface **2*b*3 and the mounting portion 410 to be in close contact with the left and right side surfaces of the third coupling surface 2*b*3 and the mounting portion 410**.

Accordingly, the gap between the third coupling surface **2*b*3 and the exhaust body 400 is sealed, and the fluid in the accommodation space 2*a* may be suppressed from leaking into the gap between the third coupling surface 2*b*3 and the exhaust body 400**.

6. Effects of the Sealing Structure of the Circuit Breaker 1 According to an Exemplary Embodiment of the Present Disclosure As described above, the sealing member 500 is provided in the gap between the arc extinguishing assembly 3 and the circuit breaker body 2 according to the present exemplary embodiment.

The sealing member 500 is elastically deformed by being pressed by the fastening force between the arc extinguishing assembly 3 and the circuit breaker body 2. The elastically deformed sealing member 500 presses the arc extinguishing assembly 3 and the circuit breaker body 2, respectively, to close the gap between the arc extinguishing assembly 3 and the circuit breaker body 2.

Accordingly, the fluid inside the accommodation space **2*a* is suppressed from leaking through the gap between the arc extinguishing assembly 3 and the circuit breaker body 2. As a result, when an arc is generated, a temporary pressure increase value inside the accommodation space 2*a*** may be increased.

In addition, the extension length of the arc is increased, whereby the arc voltage may be further increased. As a result, the arc extinguishing ability is improved, whereby, when an arc is generated, damage due to the arc in the configuration of the circuit breaker 1 may be suppressed from occurring.

In addition, the sealing member is elastically deformed by the fastening force between the arc extinguishing assembly and the circuit breaker. That is, if the fastening force between the arc extinguishing assembly and the circuit breaker is increased, the amount of elastic deformation of the sealing member is increased.

When the amount of elastic deformation of the sealing member is increased, the sealing member presses the arc extinguishing assembly 3 and the circuit breaker body 2 more strongly. That is, as the fastening force between the arc extinguishing assembly 3 and the breaker body 2 is increased, the sealing force between the arc extinguishing assembly 3 and the breaker body 2 may be improved.

Although the preferred exemplary embodiments of the present disclosure have been described above, those of ordinary skill in the art will understand that various modifications and changes may be made to the present disclosure without departing from the spirit and scope of the present disclosure as set forth in the claims below.

The present disclosure relates to an arc extinguishing assembly and a circuit breaker including the same, and it has industrial applicability because it is possible to provide an arc extinguishing assembly including a sealing member and a circuit breaker including the same.

The invention claimed is:

1. An arc extinguishing assembly, comprising:
- an exhaust which is inserted into an accommodation space having an opening formed on a first side, and covers the opening; and
- plate-shaped side portions which are respectively coupled to both side surfaces of the exhaust inside the accommodation space and spaced apart from each other by a predetermined distance to face each other,
- wherein the exhaust comprises:
  - an exhaust body having both sides coupled to the plate-shaped side portions in a first direction, an accommodation portion formed to penetrate through a center of the exhaust body, and mounting portions formed to protrude from both sides of the exhaust body in a second direction intersecting with the first direction;
  - an exhaust cover which is coupled to one side surface of the exhaust body to cover the accommodation portion; and
  - a sealing member which is coupled to the exhaust body,
- wherein mounting spaces in which the mounting portions are mounted are formed on both sides of the opening in the second direction, respectively, and
- wherein the sealing member comprises:
  - a first sealing portion which is located between the mounting portion and the mounting space and extends by a predetermined length in the first direction;
  - a second sealing portion which is located between the exhaust cover and the exhaust body and extends from both sides of the exhaust body in the first direction by a predetermined length in the second direction; and
  - a third sealing portion which is located between the mounting portion and the mounting space and connects both ends of the first sealing portion and both ends of the second sealing portion, and
- wherein the second sealing portion comprises:
  - a second base portion which extends by a predetermined length in the second direction; and
  - a wing which is formed to protrude from the second base portion in a third direction away from the accommodation portion and in a fourth direction opposite to the exhaust body and extends by a predetermined length in the second direction.

2. The arc extinguishing assembly of claim 1, wherein the sealing member comprises an elastic member.

3. The arc extinguishing assembly of claim 1, further comprising:
- an arc extinguishing assembly fastening member which penetrates the exhaust cover and the mounting portion, and has one end penetrating the exhaust cover and the mounting portion fastened to the mounting space,
- wherein the sealing member is configured to be elastically deformed by being pressed by a fastening force of the arc extinguishing assembly fastening member.

4. The arc extinguishing assembly of claim 1, wherein the predetermined length of the exhaust cover in the first direction is formed to be longer than the exhaust body, wherein cover mounting grooves for mounting both sides of the exhaust cover are formed on both sides of the opening in the first direction, and wherein the wing is located between the cover mounting grooves and the both sides of the exhaust cover.

5. The arc extinguishing assembly of claim 4, wherein the wing is configured to be elastically deformed by being pressed between one side surface of the cover mounting groove and the both sides of the exhaust cover.

6. The arc extinguishing assembly of claim 4, wherein a wing accommodation groove is formed to be recessed by a predetermined depth in a part of the exhaust cover facing the cover mounting groove.

7. The arc extinguishing assembly of claim 4, wherein a thickness of the wing is formed to be larger than a value of a distance between one side surface of the cover mounting groove and the exhaust cover.

8. The arc extinguishing assembly of claim 1, wherein a first sealing portion insertion groove and a third sealing portion insertion groove are provided in a part of the mounting portion facing the mounting space, wherein the first sealing portion is inserted into the first sealing portion insertion groove, and wherein the third sealing portion is inserted into the third sealing portion insertion groove.

9. The arc extinguishing assembly of claim 8, wherein the first sealing portion is elastically deformed by being pressed between a first side surface of the mounting space and the first sealing portion insertion groove, and wherein the third sealing portion is elastically deformed by being pressed between a second side surface of the mounting space and the third sealing portion insertion groove.

10. The arc extinguishing assembly of claim 8, wherein a thickness of the first sealing portion is formed to be larger than a value of a distance between one side surface of the mounting space and the first sealing portion insertion groove, and wherein a thickness of the third sealing portion is formed to be larger than a value of a distance between the other side surface of the mounting space and the third sealing portion insertion groove.

11. The arc extinguishing assembly of claim 1, wherein the second sealing portion comprises a hook insertion portion which extends from the second base portion in a direction close to the accommodation portion by a predetermined length and then protrudes by a predetermined length toward the exhaust body.

12. The arc extinguishing assembly of claim 11, wherein an insertion groove is provided to be recessed by a predetermined depth on one side surface of the exhaust body facing the hook insertion portion, and wherein the hook insertion portion is accommodated in the insertion groove.

13. The arc extinguishing assembly of claim 1, wherein among parts of the second base portion, a second protrusion is provided on other side surface opposite to one side surface facing the exhaust cover.

14. The arc extinguishing assembly of claim 1, wherein a first protrusion is formed on the first sealing portion to extend by a predetermined length in a direction in which the mounting portion protrudes, and wherein among parts of the mounting portion, a predetermined space into which the first protrusion is inserted is provided to be recessed on one side surface facing the first protrusion.

15. A circuit breaker, comprising:

a circuit breaker body formed with an accommodation space with one side open inside; and an arc extinguishing assembly comprising an exhaust which is inserted into the accommodation space and covers an opening of the accommodation space, wherein the exhaust comprises:

an exhaust body through which an accommodation portion is formed to penetrate a center of the exhaust body, and mounting portions are formed to protrude from both sides;

an exhaust cover which is coupled to one side surface of the exhaust body to cover the accommodation portion; and a sealing member which is coupled to the exhaust body, wherein mounting spaces in which the mounting portions are mounted are formed on both sides of an opening of the accommodation space in a first direction in which the mounting portion protrudes, respectively, wherein in the mounting spaces, a first coupling surface facing the mounting portion is provided; and a third coupling surface facing the mounting portion is provided on both sides of the first coupling surface, respectively, wherein second coupling surfaces on which both sides of the exhaust are supported are provided on both sides of the opening of the accommodation space, in a second direction intersecting with the first direction, respectively, and wherein the sealing member comprises:

a first sealing portion which is located between the mounting portion and the first coupling surface;

a second sealing portion which is located between the exhaust cover and the exhaust body, on both sides in the second direction; and a third sealing portion which is located between the mounting portion and the third coupling surface and connects both ends of the first sealing portion and both ends of the second sealing portion, and wherein the second sealing portion comprises:

a second base portion which is located between the exhaust cover and the exhaust body, on both sides in the second direction; and a wing which is formed to protrude from the second base portion in a third direction away from the accommodation portion and in a fourth direction opposite to the exhaust body.

16. The circuit breaker of claim 15, wherein the wing is located between the second coupling surface and the both sides of the exhaust cover.

17. The circuit breaker of claim 16, wherein the wing is configured to be elastically deformed by being pressed between the second coupling surface and the both sides of the exhaust cover.

18. The circuit breaker of claim 17, wherein a wing accommodation groove is provided to be recessed by a predetermined depth, in a part of the exhaust cover facing the second coupling surface.

* * * * *